June 18, 1963  M. R. HUTCHISON, JR., ETAL  3,094,051
PHOTOGRAPHIC EXPOSURE CONTROL SYSTEM
Filed Dec. 28, 1961  11 Sheets-Sheet 5

MILLER R. HUTCHISON, JR.
G. EDWIN KINDIG
INVENTORS

BY R. Frank Smith
Robert W. Hampton
ATTORNEYS

June 18, 1963  M. R. HUTCHISON, JR., ETAL  3,094,051
PHOTOGRAPHIC EXPOSURE CONTROL SYSTEM
Filed Dec. 28, 1961  11 Sheets-Sheet 6

MILLER R. HUTCHISON, JR.
G. EDWIN KINDIG
INVENTORS

BY R. Frank Smith
Robert W. Hampton
ATTORNEYS

June 18, 1963   M. R. HUTCHISON, JR., ETAL   3,094,051
PHOTOGRAPHIC EXPOSURE CONTROL SYSTEM
Filed Dec. 28, 1961   11 Sheets-Sheet 7
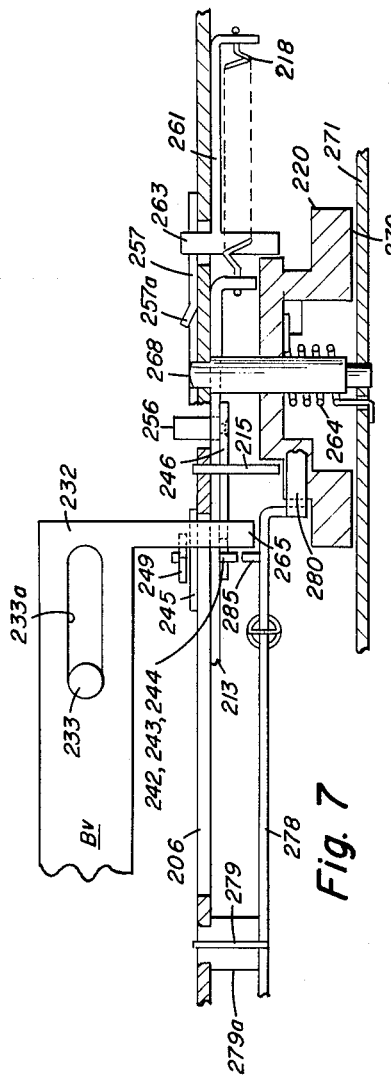
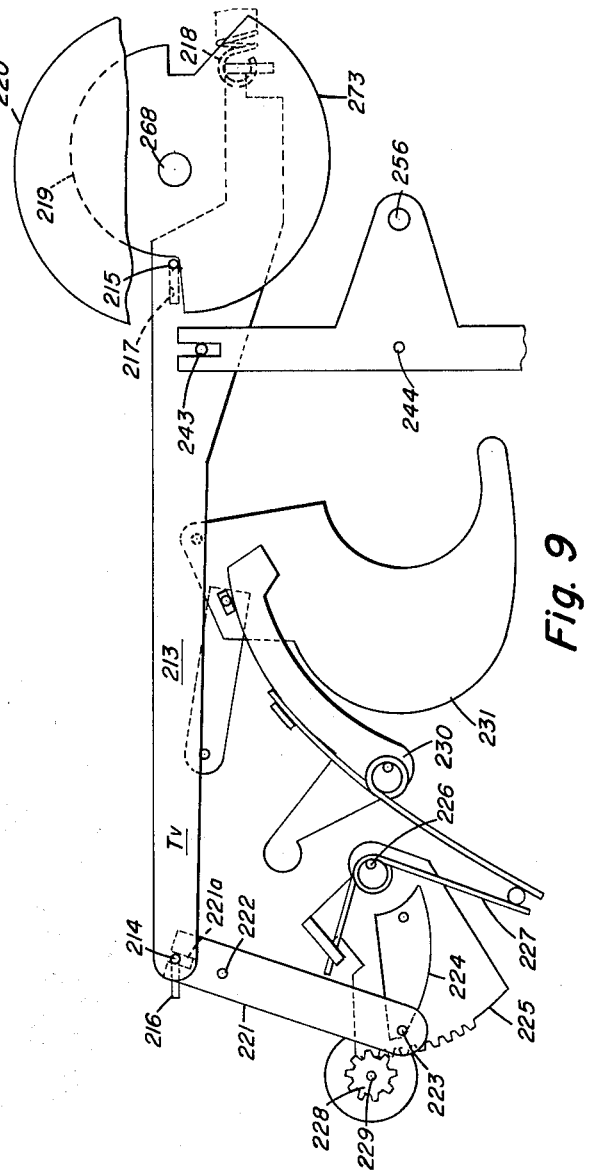
MILLER R. HUTCHISON, JR.
G. EDWIN KINDIG
INVENTORS
BY R. Frank Smith
Robert W. Hampton
ATTORNEYS

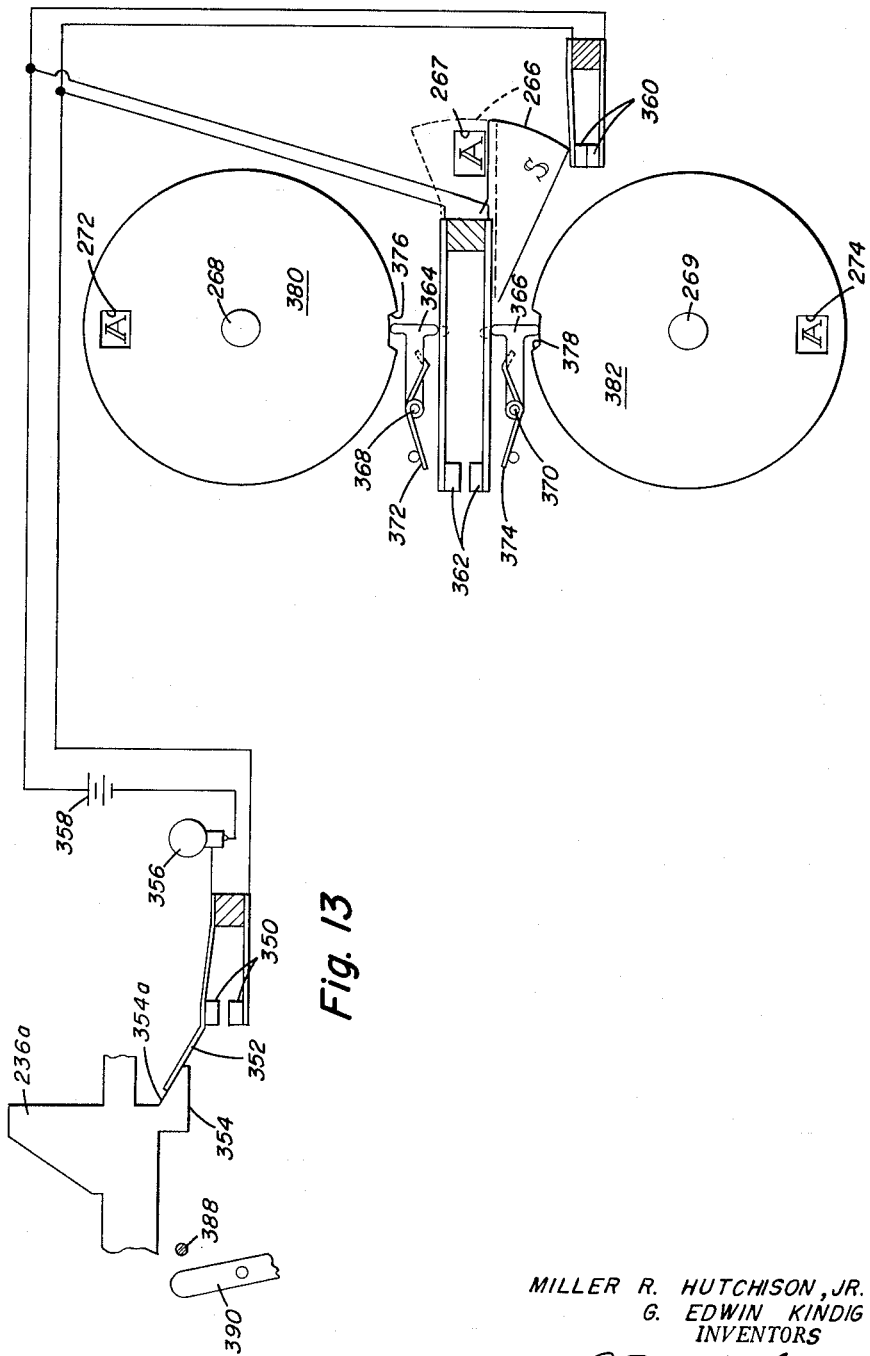

3,094,051
PHOTOGRAPHIC EXPOSURE CONTROL SYSTEM
Miller R. Hutchison, Jr., and Guilford Edwin Kindig, Rochester, N.Y., assignors to Eastman Kodak Company, Rochester, N.Y., a corporation of New Jersey
Filed Dec. 28, 1961, Ser. No. 162,861
25 Claims. (Cl. 95—10)

This invention relates to photoelectric exposure control of a still picture camera having a multi-speed shutter and having a relatively fast lens with an aperture that is adjustable over a wide range. More particularly, the invention concerns means for automatically producing normal exposure of photographic films of widely differing sensitivities, under all ordinary daylight conditions from dawn to dusk, regardless of weather.

Four principal factors combine to create a latent photographic image in a camera. These ars:
(1) Average brightness of the photographic scene or subject (field brightness);
(2) Sensitivity of the film used in the camera;
(3) Relative aperture of the camera lens; and
(4) Duration of exposure, controlled by the camera shutter.

Photoelectric exposure control is relatively easy to provide in a simple box camera, because such a camera employs but one shutter speed, has a relatively slow lens and commonly makes use of but two kinds of photographic film: one color film and one black-and-white film of relatively low sensitivity. Such a camera is used customarily to take pictures only in sunlight ranging from brilliant to open shade with clear sky, which requires a light meter responding between lens aperture values of $f/8$ and $f/32$, at the usual shutter speed and film sensitivity.

The above simple arrangement does not always satisfy the photographer accustomed to taking pictures on a large variety of films with a camera having a fast lens and a shutter with a wide range of speeds. Such a photographer frequently wants to take pictures under lighting conditions ranging from brillant sun to "rainy, dark," or sometimes after sunset outdoors, and may even expect a photoelectrically controlled camera to function satisfactorily with the existing light in an office or on a theatrical stage, conceding that a tripod may be necessary but making no other allowances.

The problems involved in devising a really comprehensive and flexible photoelectric exposure control system will be understood more readily from consideration of the following list of specifications, which are believed to be minimum requirements for satisfying an advanced amateur photographer:
(1) Incident field brightness range, 8 to 2,000 foot lamberts.
(2) Film sensitivity range, ASA–32 to ASA–256.
(3) Lens, $f/4$ relative aperture.
(4) Lens stop limits, $f/4$ to $f/64$.
(5) Shutter speed range, ¼ sec. to ½₅₀ sec.

Field brightness depends upon the intensity of the light and the reflectivity of the subject or scene. Film sensitivity is a matter of selection by the photographer. Lens aperture and shutter speed are controlled by the photoelectric exposure control system of the present invention and, by their appropriate combination, assure a normal film exposure within the limitations set by the film, or by the control system itself, or by the "programming" instructions imposed by the photographer.

The term "programming," as used in the following description and claims, refers to a camera structure and its operation, whereby both shutter speed and diaphragm settings are subject to automatic adjustment during a single camera operation, with or without some preliminary overridable selection by the photographer of a preference of motion stopping, depth of filed, or a suitable compromise between these.

If a camera, whose exposure mechanism is controlled photoelectrically, as by a light meter, is to function under all daylight conditions, i.e., through a field brightness range of 8 to 2,000 foot lamberts, it is desirable that the light meter function at maximum sensitivity at all times. This requirement rules out such expedients as meter shunts and light-limiting dampers applied to the photocell to compensate for changes in an exposure factor. In the present invention there is no need for such expedients, each exposure factor being compensated by movement of a corresponding member in a differential system.

One object of the invention is to eliminate the need to make any camera adjustment, possibly but not necessarily excepting an adjustment for the assumed sensitivity of the photographic film used.

Another object is to permit preselection of a preferred high shutter speed, or small lens aperture, which preselection can be overriden automatically, but only as a last resort to obtain normal exposure.

Another object is to permit preselection of a maximum lens aperture, which is approached automatically, starting from minimum aperture, and is exceeded automatically only as a last resort to obtain normal exposure.

Another object is to permit preselection of a minimum shutter speed, which is approached automatically, starting from maximum shutter speed, and is reduced automatically only as a last resort to otbain normal exposure.

Another object is to prevent preselection of shutter speed and film speed combinations that exceed the facility of the automatic control mechanism to prevent overexposure of the film under any field brightness within a predetermined range, e.g., under any daylight conditions.

Another object is to permit preselection of known degrees of underexposure and overexposure of films of specified sensitivity.

Another object is to employ a photoelectric cell to sense the field brightness under daylight conditions, without making use of any form of variable light-transmission control.

Another object is to employ a pivoted coil electric measuring instrument without any form of current shunt being necessary, under any daylight conditions, to control the movement of the instrument pointer.

Other objects of the invention will appear from the following description, reference being made to the accompanying drawings, wherein:

FIG. 6 is a partial bottom view of the camera mechanism showing the film sensitivity input mechanism;

FIG. 7 is a partial top view of the programming and exposure control mechanism;

FIGS. 8 to 11 are partial front views of the programming and exposure control mechanism of the fourth embodiment;

FIG. 13 is a front view of additional signal control mechanism.

For convenience of description and ready understanding, reference frequently is made in the following description to the "Unit Value" photographic exposure system, wherein the various exposure factors referred to are in units logarithmically related to the usual units of $f$ stop, etc. The unit values are related to their corresponding customary units in accordance with the following tables.

TABLE I—SCENE BRIGHTNESS

| Ft. lamberts: | $Bv$ |
|---|---|
| 8 | 3 |
| 16 | 4 |
| 32 | 5 |
| 64 | 6 |
| 125 | 7 |
| 250 | 8 |
| 500 | 9 |
| 1000 | 10 |
| 2000 | 11 |

TABLE II—LENS APERTURE

| $f$ stops: | $Av$ |
|---|---|
| 4 | 4 |
| 5.6 | 5 |
| 8 | 6 |
| 11 | 7 |
| 16 | 8 |
| 22 | 9 |
| 32 | 10 |
| 45 | 11 |
| 64 | 12 |

TABLE III—EXPOSURE TIME

| Seconds: | $Tv$ |
|---|---|
| 1/4 | 2 |
| 1/8 | 3 |
| 1/15 | 4 |
| 1/30 | 5 |
| 1/60 | 6 |
| 1/125 | 7 |
| 1/250 | 8 |

TABLE IV—FILM SENSITIVITY

| ASA: | $Sv$ |
|---|---|
| 32 | 3 |
| 64 | 4 |
| 128 | 5 |
| 256 | 6 |

FIRST EMBODIMENT

In General

Figure 1:
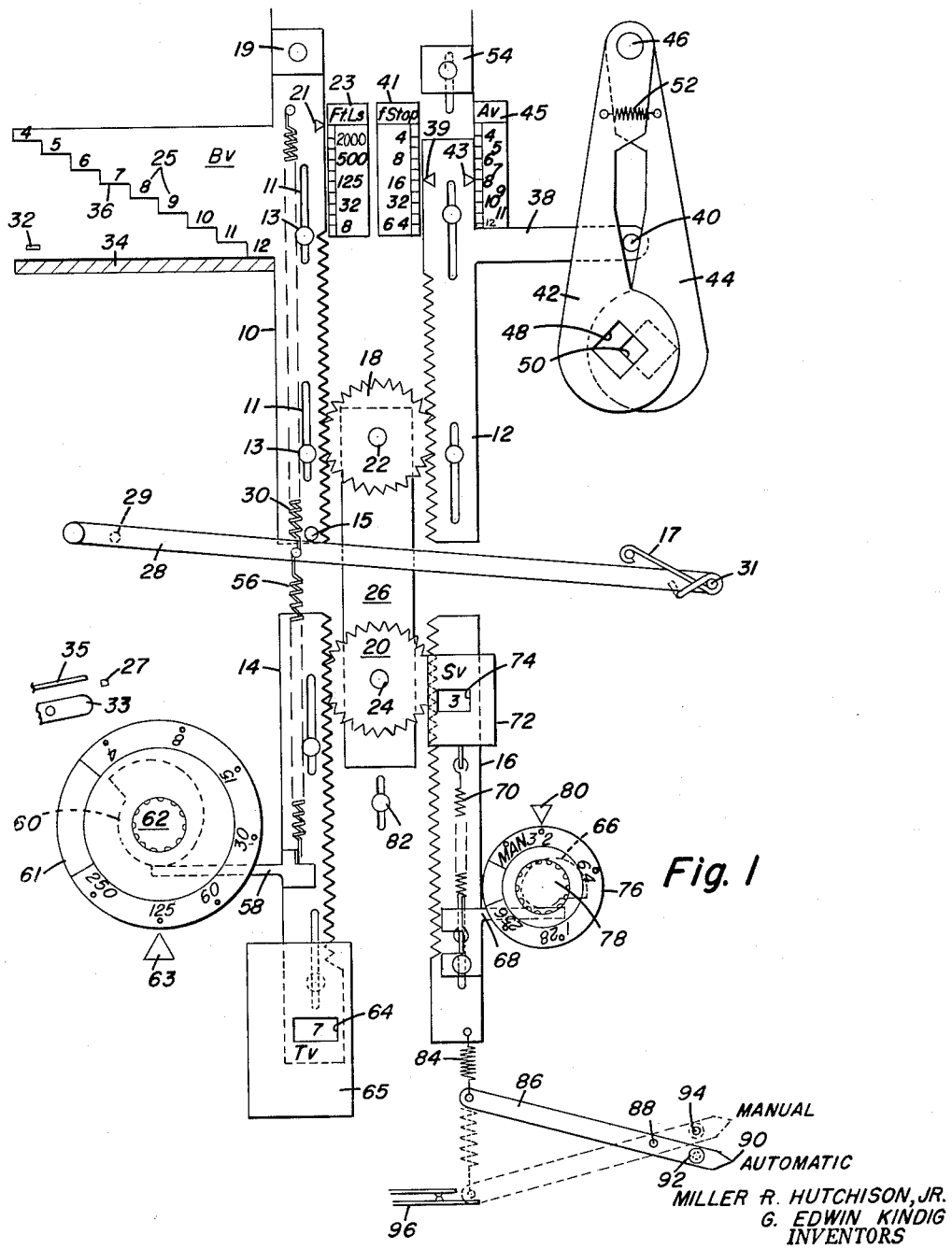
FIGS. 1 to 3 are schematic drawings of first, second and third embodiments of the invention, respectively.

Referring to FIG. 1, one form of the invention comprises four longitudinally movable control members, or slides, comprising racks 10, 12, 14 and 16, whose positions represent the respective exposure factors $Bv$, $Av$, $Tv$ and $Sv$. Slides 10 and 12 engage an upper differential pinion 18; slides 14 and 16 engage a lower differential pinion 20. Pinions 18 and 20 are journalled by respective stub shafts 22 and 24, which are mounted upon a central, fifth control member or slide 26. Slides 10, 12, 14 and 16 have slots, such as 11, by which they are guided for longitudinal sliding movement on pins, such as 13. It will be seen that each pinion 18 and 20, being in engagement with two of the slides 10, 12, 14 and 16, forms a respective differential mechanism, and that the two differential mechanisms are coordinated by the central slide 26. The combined differential mechanisms serve as an analog computer of photographic exposure, each of the slides moving as a logarithmic function of its corresponding respective exposure factor.

In FIG. 1, the position of slide 10 represents field or subject brightness ($Bv$). This slide is resiliently connected to a camera actuating member 28 by means of a spring 30, which urges slide 10 downward so that a pin 15 thereon normally engages the upper surface of member 28. The actuating member 28 is pivoted at 31 and is urged upward, or clockwise, by a spring 17, which normally maintains slide 10 against a stop 19. When the actuating member 28 is depressed, i.e., rocked counterclockwise, which is accomplished by manually overcoming the tension of spring 17, pin 15 follows the upper surface of member 28, slide 10 being driven downwardly by spring 30. The downward movement of slide 10 may be limited by a conventional arrangement of an exposure meter (the pointer of which is shown at 32), an anvil 34 and a stepped-cam sensing member 36, which is designed so that equal vertical displacements of slide 10 correspond to one-stop differences in subject brightness. An index mark 21 on slide 10 cooperates with a fixed brightness scale 23, which is graduated in foot lamberts; a corresponding series of $Bv$ indicia 25 on the steps of cam 36 identify the prevailing field brightness when the cam engages pointer 32.

As slide 10 moves downward it imparts counterclockwise movement to the upper differential pinion 18, which is shared with slide 12. The position of slide 12 represents the effective taking-lens aperture ($Av$). Slide 12 is wholly dependent upon pinion 18 for movement. This slide has an arm 38 on which is mounted a stud 40 that separates a pair of diaphragm blades 42 and 44 against the tension of spring 52. The diaphragm blades, which constitute a first exposure regulating device for the camera, are pivoted at their corresponding ends on a common stud 46 and have respective apertures 48 and 50 near their unpivoted ends, cooperating to form an exposure aperture. The blades are contoured along the edges engaging member 40, such that the area of the exposure aperture corresponds to the linear displacement of slide 12 throughout a predetermined $Av$ range. Upward movement of slide 12 increases the diaphragm opening. There is a manually adjustable stop 54 above slide 12, which serves as a variable limit to movement of that slide. A pair of index marks 39 and 43 on slide 12 cooperate with respective fixed scales 41 and 45 of $f$ stops and $Av$ numbers.

The position of slide 14 represents shutter speed, or exposure time ($Tv$). Slide 14 is resiliently connected, by a spring 56, to the camera actuating lever 28 and carries a cam follower 58, which normally is maintained in engagement with a manually adjustable cam 60 by the action of spring 56, thereby limiting the upward movement of the slide. Slide 14 also is suitably coupled to a second exposure regulating device, the shutter-speed setting mechanism (not shown in FIG. 1) for adjusting the latter. This slide is moved downward against the tension of spring 56 (to lengthen the exposure time) by the action of pinion 20.

Cam 60 is integral with a dial 61 bearing shutter speed indicia, and is moved angularly about the center of dial 61 by a manual knob 62. The scale indicia cooperate with a fixed mark 63. Slide 14 also carries shutter-speed indicia, graduated in $Tv$ numbers, which are visible through a window 64 in a fixed plate 65.

Pinion 20 also engages slide 16, the position of which represents film sensitivity ($Sv$). This slide is positioned by a film-sensitivity compensating member comprising a cam 66 cooperating with a cam follower 68, the latter being mounted on slide 16. Follower 68 normally is held in engagement with cam 66 by a spring 70, which is connected between slide 16 and a fixed plate 72. A window 74 in plate 72 exposes the film sensitivity indicia (graduated in $Sv$ numbers) carried by slide 16. The tension of spring 70 is sufficient to overcome any force that pinion 20 may exert on slide 16 tending to move the latter downward. Film sensitivity indicia also are carried by a dial 76, which is integral with cam 66 and is movable with that cam, for example by a manual knob 78, or by any of a variety of automatic film-sensitivity input devices that sense suitable coding on film, film packaging or the like. The indicia on dial 70 cooperate with a fixed mark 80.

The adjustment of $Tv$ dial 61 and of its associated cam 60 are referred to in the following description as the "shutter speed preference" adjustment. This adjustment allows the camera operator to select a preferred, relatively high shutter speed, for example when he wishes to photograph a moving subject. The adjustment of the $Sv$ dial 76 and its associated cam 66 enters into the exposure control system the film sensitivity to be reckoned by it in computing the exposure requirements.

The central slide 26, which carries pinions 18 and 20, coordinates the other four slides in accordance with the photographic exposure equation, $Bv+Sv=Ev=Av+Tv$. A manually or automatically adjustable stop 82 prevents downward movement of slide 26 beyond a predetermined point. Slide 26 moves downward with increases of exposure time and/or film sensitvity. Were this movement not limited by stop 82, the camera operator could preselect an exposure time too long for normal exposure of film of the sensitivity selected by dial 76. In the illustrated example, the position of stop 82 limits the minimum shutter speed preference to $\frac{1}{30}$ sec. ($Tv$ 5), when film sensitivity is ASA 256 ($Sv$ 6), and to $\frac{1}{4}$ sec. ($Tv$ 2) when the film sensitivity is ASA 32 ($Sv$ 3); proportionate shutter speed limiations occur between these extreme values of film sensitivity. It will be seen that stop 82 not only prevents the selection of an off-range shutter speed when film sensitivity is selected first (as is the usual case), but also prevents the selection of an off-range film sensitivity when the shutter speed is selected first, in reverse of the usual order of selection. The adjustability of stop 82 is useful in connection with intentional overexposure of the film, and with fully manual selection of the exposure factors, as will be explained hereinafter.

The energy required to operate the automatic exposure control system may be supplied manually at the camera actuating member 28 which, as noted earlier, is resiliently connected to the $Bv$ slide 10, which permits the actuating member 28 to complete its travel, for tripping a shutter trigger 33, regardless of the stopping position of sensing member 36 and the $Bv$ slide 10. It will be noted that the force required to operate the actuating member 28 is reduced by supporting the $Tv$ slide spring 56 by member 28 (in opposed relation to spring 17) instead by a fixed frame member.

The automatic modes of operation of the above described exposure control system will now be explained.

*Mode I—Automatic With Preferred Shutter Speed*

This mode is characterized by maintaining the preselected shutter speed as long as the prevailing field brightness can be compensated by automatic diaphragm adjustment, then the progressive reduction of shutter speed, after full aperture has been set, until the combination of shutter speed and full aperture corresponds to field brightness.

The operator loads the camera with film, indicating its sensitivity by turning the $Sv$ dial 76, selects a preferred shutter speed by turning the $Tv$ dial 61, and adjusts the $Av$ slide stop 54 to permit full aperture when required. Assume the following factor setting: $Sv=6$ (ASA 256) and preferred $Tv=8$ ($\frac{1}{250}$ sec.).

With the camera actuating member 28 in its rest, or uppermost position, the respective positions of the four principal slides are assumed as follows: $Bv=12$, $Av=10$, $Sv=6$ and $Tv=8$.

When field brightness is maximum, i.e., when pointer 32 is in its rightmost position, downward movement of the actuating member 28 draws the $Bv$ slide 10 only as far as $Bv=11$. Slides 14 and 16 are maintained in their set positions by springs 56 and 70, respectively, thereby maintaining the central slide 26 stationary. The $Bv$ slide 10 rotates pinion 18 counterclockwise, thereby moving the $Av$ slide 12 from $Av=10$ to $Av=9$. Further movement of the actuating member 28 stretches spring 30 without moving any of the slides, and finally trips the shutter trigger 33 for making an exposure.

Under conditions of successive unit reductions of field brightness, the $Bv$ slide 10 would be moved downward in corresponding steps before sensing member 36 engaged pointer 32, such that the $Av$ slide 12 would be raised to higher positions, up to a limit position of $Av=4$. Any further reduction of field brightness below $Bv=6$, for the assumed field sensitivity ($Sv=6$), could not be compensated by changing $Av$ to enlarge the lens aperture.

When the maximum aperture earea ($Av=4$) has been reached, further movement of the $Bv$ slide 10 causes the upper differential pinion 18 to roll downward along the rack forming part of the $Av$ slide 12, and thereby forces the central slide 26 to follow the $Bv$ slide 10 at half the speed of the latter. This, in turn, rolls the lower differential pinion 20 downward (counterclockwise) along the rack forming part of the motionless $Sv$ slide 16, thereby transmitting downward drive to the $Tv$ slide 14 against the tension of spring 56, which is lighter than the $Sv$ spring 70. The $Tv$ slide 14 is driven downward at twice the speed of the central slide 26, i.e., at a rate identical with that of the $Bv$ slide 10; therefore, each successive unit reduction of field brightness causes a unit reduction of shutter speed and maintains uniform film exposure. This can be proceed until the central slide 26 engages its limit stop 82, which occurs when $Tv=5$ ($\frac{1}{30}$ sec.) for the assumed film speed of ASA 256 ($Sv=6$).

The operation of the foregoing exposure control system proceeds in a similar manner when other film sensitivities and shutter speed preferences are selected. The lowest shutter speed preference that can be selected for the film sensitivity of $Sv=6$ (ASA 256) used in the above example is $Tv=5$ ($\frac{1}{30}$ sec.) With preselection of this shutter speed, the $Av$ sequence starts at $Av=12$, and ends at $Av=4$, the exposure obviously being made at the preselected shutter speed of $Tv=5$, which already has been identified as the limiting value for the assumed film sensitivity. Lower $Tv$ preferences may be preselected for correspondingly less sensitive films, with similar behavior of the exposure control mechanism.

The mode of operation described above permits considerable emphasis to be placed by the camera operator upon motion-stopping, on the one hand, and depth of focus, on the other, while guaranteeing automatically the normal exposure of the film under all daylight conditions. Should he preselect an impossible pair of $Sv$ and $Tv$ values, he would get a normal exposure in any case (within the permissible field brigtthness range) and as close an approach to his preselection as the field brightness permits for the film in use.

Use may be made of the $Sv$ dial to cause an intentional overexposure or underexposure of the film. For example, the camera operator may wish to use a fast film under conditions of very low field brightness (lower than the minimum response of the light meter), still sufficient for a normal exposure if advantage is taken of shutter speeds slower than permitted automatically. Thus, in the earlier example, he might make use of $Tv=4$ at $Av=4$ and $Bv=1.5$ by dialing a film sensitivity of $Sv=5$ for a film of $Sv=6$ actual sensitivity, and so on.

It has been noted that the actuating member 28 must reach nearly the end of its travel to trip the shutter. This position is somewhat beyond that required to move the $Bv$ slide 10 to its lowest position (at $Bv=3$). Accordingly, it may be desirable to provide a mechanical stop between these two positions so that the camera operator may aim the camera, depress the actuating member to the stop without tripping the shutter, hold it there to inspect the values indicated by the several slides against their scales, and so acquaint himself with the ranges of factor values that the system will use for the prevailing field brightness when the stop is removed. This feature is illustrated in FIG. 1 by a detent 27 into which a pin 29 on member 28 may be inserted to hold the latter member in its near downward position, which the operator senses by means of an additional spring 35 engaged by member 28 just before the latter member reaches its detent position.

Mode II—Automatic With Preferred Lens Aperture

In the second mode of operation, the camera operator may preselect a limiting maximum for the lens aperture. The second mode is otherwise the same as Mode I.

The lens aperture controls the depth of focus of the lens and influences image resolution. As noted earlier, an adjustable stop 54 is provided for the Av slide 12. This stop may be adjusted by the camera operator, in Mode II, for preselecting an absolute maximum for the aperture size.

As described above, when the Av slide 12 is stopped to prevent further enlargement of the lens aperture, the automatic exposure control system responds to further downward movement of the Bv slide 10 by decreasing the shutter speed. As an example, consider the operation of the exposure control system when the shutter speed preference and film sensitivity are preselected the same as those employed to illustrate Mode I, and the camera operator now further restricts the maximum aperture to $Av=7$ ($f/11$). The operation is the same as in Mode I until slide 10 moves downward to $Bv=9$ and slide 12 reaches its limit ($Av=7$). If slide 10 moves further to $Bv=8$, shutter speed is reduced from $Tv=8$ to $Tv=7$ to maintain normal exposure, and so on until shutter speed becomes $Tv=2$ when slide 10 moves to the limit position $Bv=3$. It will be noted that the former minimum shutter speed ($Tv=5$) becomes $Tv=2$ (a change of three units), because the maximum aperture (formerly $Av=4$) has been restricted to $Av=7$ (also a change of three units).

In the embodiment illustrated in FIG. 1, no provision is made for shutter speed less than $Tv=2$. It is easily understood that the extent to which the size of the lens aperture may be limited by preselection in this mode of operation is controlled by the selection of film sensitivity, provided it is desired that the camera make normal exposures at the minimum field brightness to which the light meter responds. If there is sufficient light, any limitation desired may be imposed upon the lens aperture, within its own range, and the camera will make an exposure.

In connection with Mode II, it should be understood that the resilient connection of the actuating member 28 with the control mechanism allows the former to be moved through its full stroke even if, because of prevailing light and limitations imposed upon the control mechanism by the camera operator, the control mechanism cannot follow the actuating member sufficiently far to assure a normal exposure. In any event, at full stroke of the actuating member, the shutter is triggered, the exposure control mechanism having been adjusted as far as possible toward a normal exposure.

Mode III—Manual

This mode is characterized by entirely manual operation of the shutter and lens aperture controls without interference from the automatic exposure control mechanism.

For manual control, it is necessary to prevent the meter pointer 32 from interfering with movement of the Bv slide 10, in order that the Av slide 12 may be moved throughout its full range without disturbing the central slide 26. Pointer 32 of the light meter may be moved to its no-light position by opening the electrical circuit between the instrument and the photoelectric cell powering it, or by masking the cell, as well known in the art. Again, the camera actuating member moves the Bv slide 10 through its resilient connection therewith, and slide 10 moves the Av slide 12 by means of the upper differential pinion 18. The desired lens aperture for the photograph is preselected by manual preadjustment of the Av slide stop 54. When the Av slide 12 reaches its limit position, as determined by the preadjustment of stop 54, the Bv slide 10 also stops and the actuating member 28 moves to the shutter-tripping position by stretching spring 30.

For manual control, it also is necessary to free the Tv slide 14 for movement to any preselected shutter speed without disturbing the central slide 26. To this end, the Sv cam 66 must be turned to the position for minimum film sensitivity (just counterclockwise from ASA 32 in FIG. 1), which may be a position marked "MAN" (for manual) on dial 76. This permits preselection of $Tv=2$, the minimum. Further, the Sv slide 16 must be free to move downward sufficiently to accommodate a preselection of $Tv=8$, the maximum. No mechanical stop is placed below the Sv slide, because the previously described spring 70 normally prevents this slide from moving downward beyond position selected by knob 76. A spring 84, which is heavier than spring 70, is connected between the Sv slide 16 and a mode-selecting lever 86, pivoted at 88. Lever 86 has a pointer 90 and a spring pin 92 adapted to enter either of a pair of fixed detent holes, one of which is shown at 94. For manual control, lever 86 is pivoted to its broken-line position, where it is latched by entry of pin 92 into the upper detent hole 94. This holds enough tension in spring 84 to overcome the tension of the lighter spring 70 and maintains slide 16 in its full downward position. When slide 16 moves downward it rotates the lower differential pinion 20 clockwise, thereby urging the Tv slide 14 upward, which movement is resisted by the action of the Tv cam 60 in limiting engagement with its cam follower 58, attached to the Tv slide. The lower differential pinion 20 therefore reacts on the central slide 26, forcing the latter downward against its stop 82, where slide 26 comes to rest and remains undisturbed during manual operation of the exposure control system.

A normally closed switch 96 for opening the light meter circuit, for the reason mentioned above, may also be opened by movement of lever 86 to its "Manual" position, as illustrated in FIG. 1.

in Ev simultaneously produces a programmed one-half are preselected, the actuating member 28 is depressed; the lens diaphragm closes to the extent indicated by the position of the Av slide stop 54. The picture is then taken at the preselected and indicated shutter speed.

SECOND EMBODIMENT

Mode I—Automatic

In the second embodiment (FIG. 2) the arrangement of the factor slides 10, 12, 14 and 16 is different from that of FIG. 1: the Bv slide 10 and the Sv slide 16 cooperate with the upper differential pinion 18, whereas the Av slide 12 and the Tv slide 14 cooperate with lower pinion 20. In the first embodiment the central slide 26 did not represent a quantity in the equation $Bv+Sv=Ev=Av+Tv$, but here its position represents the Ev number of the system. Accordingly, slide 26 is provided with an index mark 67 cooperating with a fixed Ev scale 69. The camera actuating member 28 is resiliently connected with the Bv slide 10 and the Tv slide 14, as in the previous embodiment, and actuates the shutter tripping member 33 near the bottom of its stroke.

In this embodiment there is no shutter speed preference dial; instead, a limit is fixed upon the extent to which the lower differential pinion may turn clockwise from its rest position. A stop 100 cooperates with a lever 102 pivoted at 104 and having a gear segment 106 meshing with the lower pinion 20. Stop 100 prevents clockwise movement of pinion 20 altogether when Sv equals 3: it permits such movement equivalent to a single stop at $Sv=4$, two stops at $Sv=5$, and three stops at $Sv=6$.

From the description of FIG. 1 it will be recalled that the behavior of the Tv slide 14 depends partly upon the rolling of the lower differential pinion 20 upon the stationary Sv slide 16. In the present embodiment the Av slide 12, rather than the Sv slide 16, is opposite the Tv slide 14 and cooperates with pinion 20. The Av slide becomes stationary only upon reaching a limit normally set at $Av=4$. It will be obvious that the Tv slide 14 must move in unison with the E$v$ slide 26, once it becomes impossible for the lower differential pinion 20 to turn. At that time, the A$v$ slide 12 must also move in unison with the E$v$ slide 26. Under these circumstances the E$v$, T$v$ and A$v$ slides move as a unit. Thus, a one-stop change in E$v$ simultaneously produces a programmed one-half stop change in each of T$v$ and A$v$, i.e., a one-half stop change in shutter speed as well as a one-half stop change in diaphragm aperture.

The program followed depends upon the film sensitivity dialed. When S$v$=6 is dialed, the following sequence of slide positions occurs as the B$v$ slide 10 moves from B$v$=11 to B$v$=3:

| B$v$ | 11 | 10 | 9 | 8 | 7 | 6 | 5 | 4 | 3 |
|---|---|---|---|---|---|---|---|---|---|
| S$v$ | 6 | 6 | 6 | 6 | 6 | 6 | 6 | 6 | 6 |
| E$v$ | 17 | 16 | 15 | 14 | 13 | 12 | 11 | 10 | 9 |
| A$v$ | 9 | 8 | 7 | 6½ | 6 | 5½ | 5 | 4½ | 4 |
| T$v$ | 8 | 8 | 8 | 7½ | 7 | 6½ | 6 | 5½ | 5 |

When a film sensitivity of S$v$=3 is dialed the following sequence occurs while the B$v$ slide 10 moves from B$v$=11 to B$v$=3:

| B$v$ | 11 | 10 | 9 | 8 | 7 | 6 | 5 | 4 | 3 |
|---|---|---|---|---|---|---|---|---|---|
| S$v$ | 3 | 3 | 3 | 3 | 3 | 3 | 3 | 3 | 3 |
| E$v$ | 14 | 13 | 12 | 11 | 10 | 9 | 8 | 7 | 6 |
| A$v$ | 6½ | 6 | 5½ | 5 | 4½ | 4 | 4 | 4 | 4 |
| T$v$ | 7½ | 7 | 6½ | 6 | 5½ | 5 | 4 | 3 | 2 |

Such automatic programs may be modified by changing the degree of freedom of the lower differential pinion 20 to turn clockwise. If this freedom is increased, the reduction in T$v$ is delayed. If no limit is applied to pinion 20, the program for film of S$v$=6 becomes:

| B$v$ | 11 | 10 | 9 | 8 | 7 | 6 | 5 | 4 | 3 |
|---|---|---|---|---|---|---|---|---|---|
| S$v$ | 6 | 6 | 6 | 6 | 6 | 6 | 6 | 6 | 6 |
| E$v$ | 17 | 16 | 15 | 14 | 13 | 12 | 11 | 10 | 9 |
| A$v$ | 9 | 8 | 7 | 6 | 5 | 4 | 4 | 4 | 4 |
| T$v$ | 8 | 8 | 8 | 8 | 8 | 8 | 7 | 6 | 5 | and that for S$v$=3 becomes:

| B$v$ | 11 | 10 | 9 | 8 | 7 | 6 | 5 | 4 | 3 |
|---|---|---|---|---|---|---|---|---|---|
| S$v$ | 3 | 3 | 3 | 3 | 3 | 3 | 3 | 3 | 3 |
| E$v$ | 14 | 13 | 12 | 11 | 10 | 9 | 8 | 7 | 6 |
| A$v$ | 6 | 5 | 4 | 4 | 4 | 4 | 4 | 4 | 4 |
| T$v$ | 8 | 8 | 8 | 7 | 6 | 5 | 4 | 3 | 2 |

Further programs can be selected by adjusting a movable A$v$ slide stop so as to limit the maximum area of lens aperture to be employed. When the A$v$ slide reaches stop 108, further downward movement of the B$v$ slide 10 can be compensated only by increased exposure time, and this only until the T$v$ slide limit is reached. As an example, assume that pinion 20 is free to turn clockwise an amount equivalent to two stops change in E$v$, and assume that stop 108 is adjusted to limit the downward movement of slide 12 to A$v$=6. The program for a film sensitivity of S$v$=6 then becomes:

| B$v$ | 11 | 10 | 9 | 8 | 7 | 6 | 5 | 4 | 3 |
|---|---|---|---|---|---|---|---|---|---|
| S$v$ | 6 | 6 | 6 | 6 | 6 | 6 | 6 | 6 | 6 |
| E$v$ | 17 | 16 | 15 | 14 | 13 | 12 | 11 | 10 | 9 |
| A$v$ | 9 | 8 | 7½ | 7 | 6½ | 6 | 6 | 6 | 6 |
| T$v$ | 9 | 8 | 7½ | 7 | 6½ | 6 | 5 | 4 | 3 | and that for S$v$=3 becomes:

| B$v$ | 11 | 10 | 9 | 8 | 7 | 6 | 5 | 4 | 3 |
|---|---|---|---|---|---|---|---|---|---|
| S$v$ | 3 | 3 | 3 | 3 | 3 | 3 | 3 | 3 | 3 |
| E$v$ | 14 | 13 | 12 | 11 | 10 | 9 | 8 | 7 | 6 |
| A$v$ | 6 | 5 | 4½ | 4 | 4 | 4 | 4 | 4 | 4 |
| T$v$ | 8 | 8 | 7½ | 7 | 6 | 5 | 4 | 3 | 2 |

*Mode II—Manual*

Figure 2:
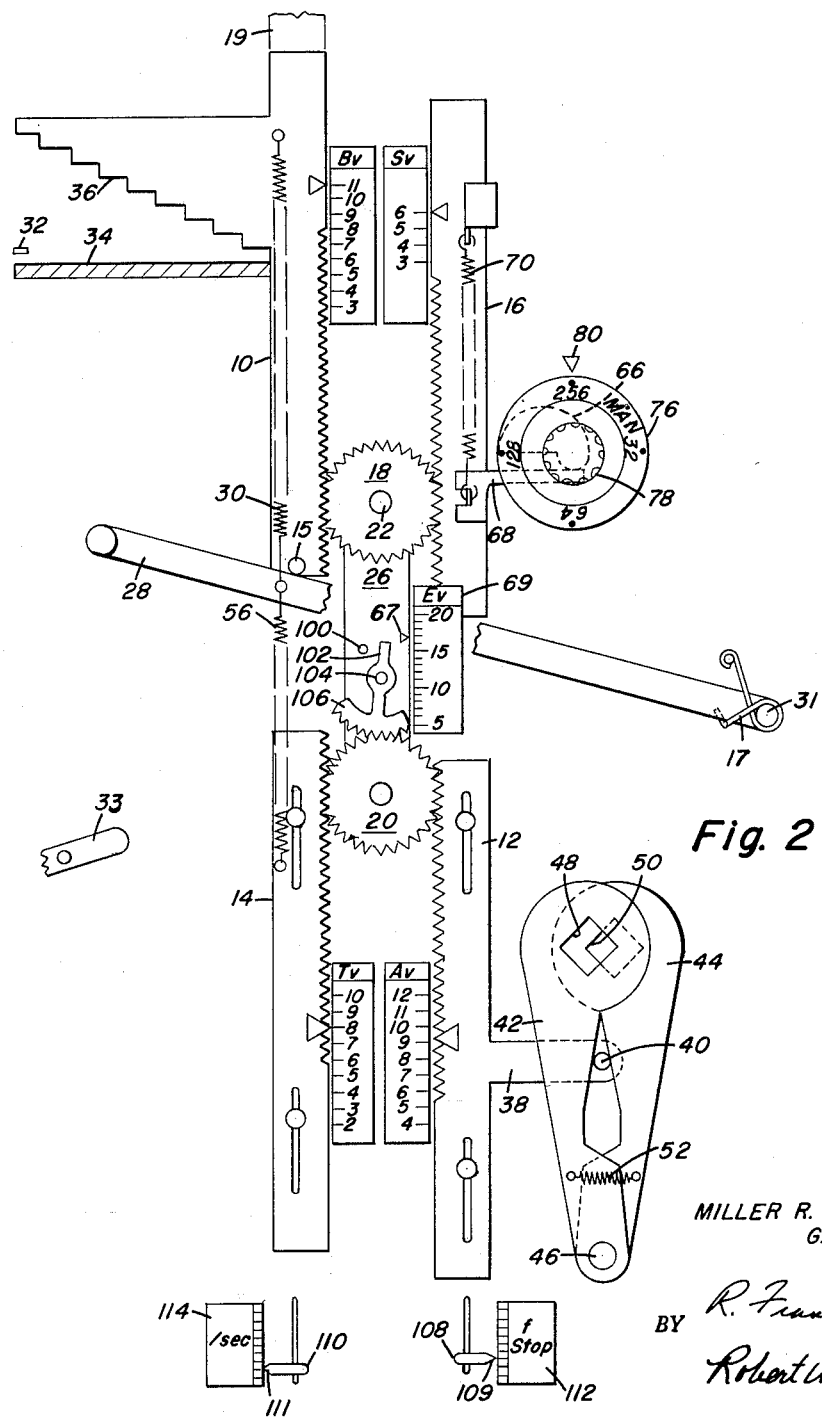

The embodiment shown in FIG. 2 may be adapted for manual operation by setting the adjustable stop 108 below the A$v$ slide 12 and a corresponding stop 110 below the T$v$ slide 14. These stops have respective pointers 109 and 111 cooperating with scales 112 and 114, which are visible to the camera operator and which are graduated in units of shutter speed and diaphragm opening, respectively. For manual operation the system is modified further to disable the meter circuit, as described in connection with FIG. 1.

The S$v$ slide 16 is dialed to its position marked "MAN" (corresponding to S$v$=6) in order to raise the A$v$ slide 12 initially to its position of A$v$=10, corresponding to minimum aperture size. Therefore, the initial positions of the slides are as follows: B$v$=12, S$v$=6, E$v$=18, A$v$=10 and T$v$=8. It will be noticed that the positions for slide 12 of A$v$=11 and A$v$=12 are unavailable unless arrangement is made for the S$v$ slide to move farther upward, to a position corresponding with S$v$=8, which may be done if desired.

Manual operation then requires: (1) turning the S$v$ dial to S$v$ maximum; (2) preselecting A$v$ and T$v$ by adjusting the corresponding slide stops 108 and 110; and (3) depressing the camera actuating member 28 to release the shutter.

When member 28 is depressed it pulls the B$v$ slide 10 after it through spring 30. The E$v$ slide 26 moves with the B$v$ slide 10 at half-speed. The lower differential pinion 20 rolls clockwise on the T$v$ slide 14, which remains stationary at T$v$=8 under the tension of spring 56. The rolling of pinion 20 transmits force, originating at the actuating member 28, through the B$v$ slide 10 and the E$v$ slide 26, to the A$v$ slide 12, which is moved downward until it comes against the preset stop 108. Pinion 20 then turns in the opposite direction (counterclockwise) on the arrested A$v$ slide 12 and transmits the driving force to the T$v$ slide 14, thereby overcoming the tension of spring 56, which weakens as member 28 moves downward. The T$v$ slide 14 moves downward until it reaches the preset stop 110. The control mechanism is now at rest, except for the actuating member 28, which can be moved through its entire stroke for triggering the shutter. The picture is taken at the preselected aperture and shutter values, as required.

To return the system to automatic operation, the A$v$ and T$v$ stops 108 and 110 are moved to their bottom positions and the S$v$ dial 76 is turned to select the proper film sensitivity. It can be arranged, by suitable coupling mechanism, that the turning of the film dial 76 away from its "MAN" position automatically releases the slide stops 108 and 110, so that they will return to their bottom positions without separate handling.

In the foregoing description of two embodiments of the invention, certain assumptions were made regarding the range of photographic variables and the scope of automatic exposure control available by such means. It will be understood that other values than those assumed above may be equally useful and are within the scope of the invention.

The description of the changes in programming of the mechanisms by the adjustment of stops, etc., is based on assumed values and certain requirements dictated by the wishes of the camera operator. Other values and requirements might dictate further program modifications of which the basic mechanism is capable. For example, a camera may not be required to possess the versatility assumed; it may be provided with a simpler shutter having a relatively narrow speed range. Also, it may be acceptable to a camera operator to have only one fixed program in the automatic exposure control system, such as a program that first exhausts the diaphragm adjustment while maintaining the highest shutter speed, then reduces the shutter speed with the lens diaphragm at maximum aperture. For such a camera, the present invention is illustrated further from the following description of a third embodiment.

THIRD EMBODIMENT

Figure 3:
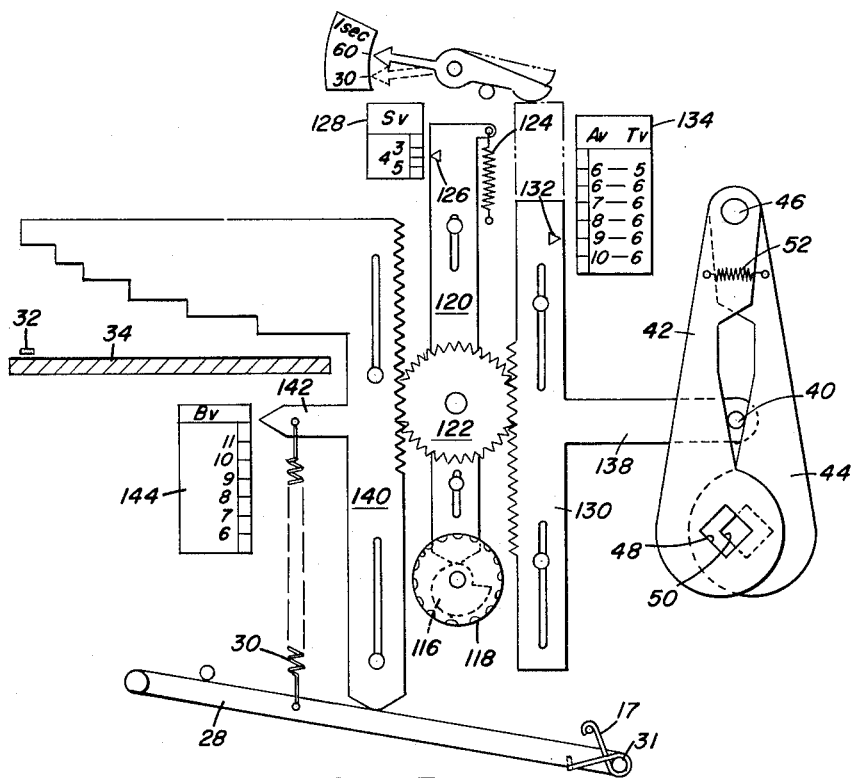

Referring to FIG. 3, the position of a single slide 130 represents both A$v$ and T$v$. Slide 130 carries an index mark 132 cooperating with a scale 134 of A$v$ and T$v$. It will be obvious that the position of slide 130 also represents E$v$. An arm 138 on slide 130 carries the diaphragm drive pin 40, and slide 130 is otherwise suitably coupled to the shutter speed setting member. The phase relation between $Bv$ and $Ev$ ($Av+Tv$) is fixed by adjusting an $Sv$ cam 116, for example by means of a manually operable knob 118. The $Sv$ cam 116 acts directly on an $Sv$ slide 120, which carries a differential pinion 122 and is urged downward against cam 116 by a spring 124. Slide 120 also carries an index mark 126 cooperating with an $Sv$ scale 128. Pinion 122 also cooperates with a $Bv$ slide 140, which is connected by spring 30 to the camera actuating member 28, as in the first two embodiments. A pointer 142 on slide 140 cooperates with a brightness scale 144 and carries spring 30.

It will be seen that for any value of film sensitivity set into cam 116, slide 120 carries its pinion 122 to a fixed vertical position. Accordingly, for any fixed film sensitivity, downward movement of the $Bv$ slide 140 causes an equal upward movement of the combined $Av+Tv$ slide 130, thereby changing aperture and shutter-speed settings together in accordance with any desired one of a variety of predetermined programs, as illustrated on scale 134.

FOURTH EMBODIMENT

In General

The fourth embodiment of the invention is illustrated in FIGS. 4–11 and, like the first three embodiments, comprises a programmed exposure control system based upon a variable differential mechanism. This embodiment is illustrated in a less schematic manner and supplements FIGS. 1–3 by showing, for example, a typical practical coupling between the $Tv$ differential member and the shutter speed setting member.

The fourth embodiment is capable of four principal modes of operation, as follows:

Mode I

Lens aperture ($Av$) and shutter speed ($Tv$) are adjusted automatically in a predetermined program until field brightness ($Bv$) is compensated.

Mode II $Tv$ preference is set manually; $Av$ is adjusted automatically to compensate for $Bv$; if maximum aperture does not fully compensate $Bv$, then $Tv$ is adjusted automatically until compensation is complete.

Mode III $Av$ preference is set manually; $Tv$ is adjusted automatically to compensate for $Bv$; if minimum shutter speed does not fully compensate $Bv$, then $Av$ is adjusted automatically until compensation is complete.

Mode IV

Complete manual operation.

GENERAL STRUCTURAL FEATURES

The conversion from one mode of operation to another can be made at any time by setting the appropriate controls.

Figure 4:
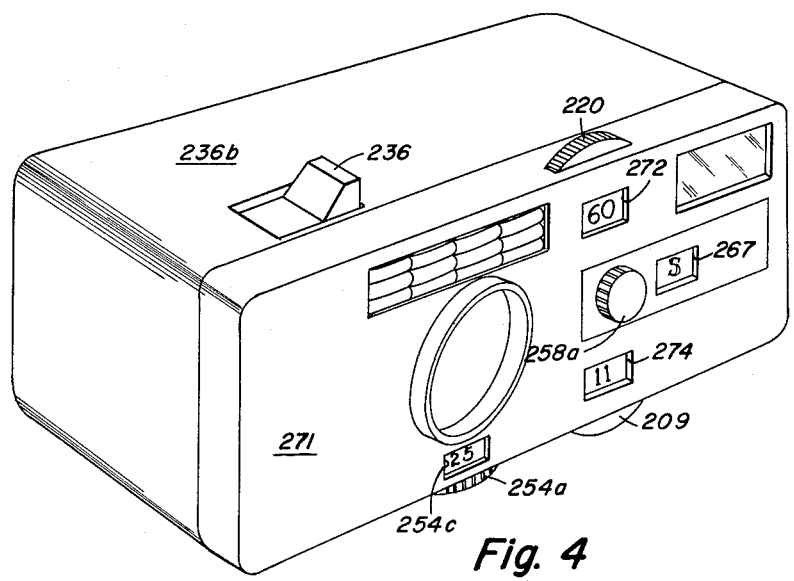
FIG. 4 is an isometric view of a camera employing a fourth embodiment of the invention.
Figure 5:
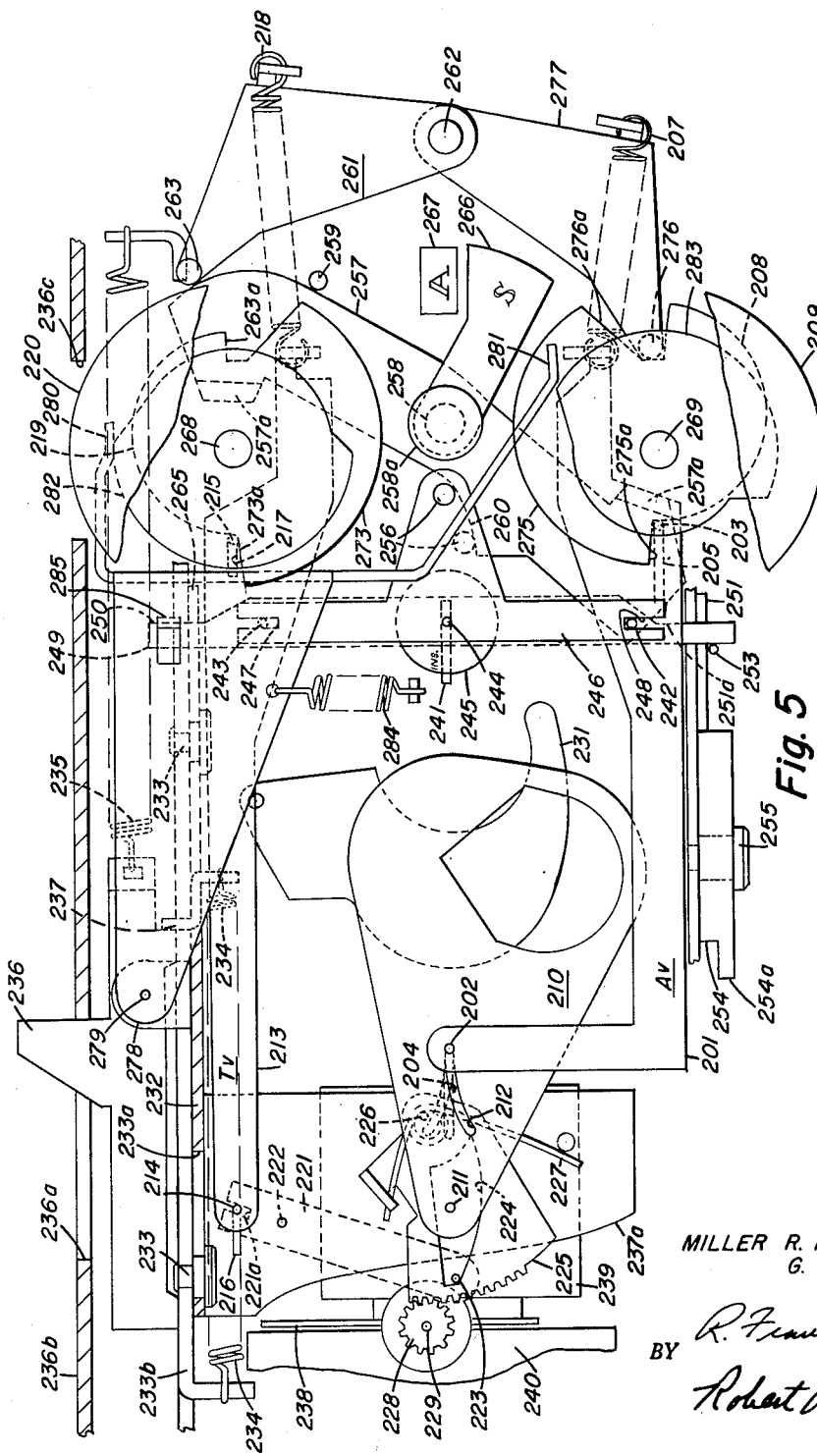
FIG. 5 is a front view of the programming and exposure control structure of the fourth embodiment.

FIG. 4 shows the general arrangement of the controls, etc., of the roll film camera employing the fourth embodiment of the exposure control system. FIGS. 5–7 show substantially the entire exposure control and programming structure. FIGS. 8–11 show various portions of that structure.

Referring to FIGS. 5, 7 and 8, a diaphragm control ($Av$) slide 201, to which two pins 202 and 203 are fixed, is guided for lateral movement by engagement of these pins in respective slots 204 and 205 of a mechanism plate 206 (FIG. 7). Slide 201 is urged to the right, as viewed in the drawings, by a spring 207, thereby normally maintaining pin 203 against a cam surface of an aperture selecting knob 209, the functions of which are described hereinafter.

A pair of diaphragm vanes 210 (for simplicity, only one is shown in FIG. 5) are pivoted on a pin 211 for movement in opposite angular directions, in order to form an exposure aperture from a pair of complementary apertures 210b in the vanes. A respective cam slot 212 in each vane engages pin 202, such that a movement of slide 201 to the left enlarges the exposure aperture. The cam slots 212 are so shaped as to vary $Av$ linearly with the movement of slide 201.

Referring to FIGS. 5, 7 and 9, a shutter speed ($Tv$) slide 213, to which a pair of pins 214 and 215 are fixed, is guided for lateral movement by engagement of these pins in respective slots 216 and 217 of mechanism plate 206. Slide 213 is urged to the right by a spring 218, thereby normally maintaining pin 215 in engagement with a cam surface of a shutter-speed selecting knob 220, which is accessible to the camera operator through a slot 236c in a top cover 236b of the camera. The functions of knob 220 are described hereinafter.

Pin 214 on the $Tv$ slide 213 engages a slot 221a (FIGS. 5 and 9) in one end of a lever 221, which is pivoted on a pin 222. A pin 223 is fixed to the other end of lever 221 and engages the surface of a cam slot 224 in a sector gear 225, which is pivoted on a pin 226. A spring 227 urges sector gear 225 clockwise about pin 226 to maintain cam surface 224 in engagement with pin 223. Sector gear 225 meshes with a weighted pinion gear 228, which is pivoted at 229 and which constitutes the speed setting member of a typical shutter, for example of the type disclosed in U.S. Patent 2,119,831. Thus the lateral position of the $Tv$ slide 213 controls the angular position of sector 225, thereby regulating the shutter speed. Cam slot 224 is so shaped as to produce continuous $Tv$ changes linearly with the movement of slide 213.

Sector 225 cooperates with a blade drive lever 230 (FIG. 9) and a shutter blade 231 in a conventional manner. For simplicity, only one shutter blade 231 is shown in FIGS. 5 and 9, while in FIG. 8, the mechanism interrelating sector 225 and blade 231 is omitted. Sector 225 may be held in a fixed, limit position by suitable means (not shown) during adjustment of $Tv$ slide 213, in order to avoid interference by spring 227 with the operation of the differential system.

Referring again to FIGS. 7 and 8, two slots 233a in a $Bv$ slide 232 receive respective pins 233, which are mounted on a frame member 233b, and guide the $Bv$ slide 232 for lateral movement. This slide is urged to the left by a spring 234. A stronger spring 235 is connected to a camera actuating member 236, which engages a lug 237 on slide 232 for normally maintaining that slide in its rightward position against the tension of spring 234. Actuating member 236 moves in a slot 236a in the top cover 236b of the camera. Manual movement of actuating member 236 to the left overcomes spring 235 and permits spring 234 to move slide 232 to the left until a cam surface 237a, which is integral with slide 232, is arrested by contact with the pointer 238 of a light meter 239. An anvil 240 supports the pointer against bending. Angular pointer movement is proportional to field brightness $Bv$, and cam surface 237a is so shaped, in relation to the meter and photocell characteristics, that increments of $Bv$ correspond linearly with the movement of slide 232.

Referring to FIGS. 5, and 7–9, a slot 241 in mechanism plate 206 is located substantially equidistant from a pair of pins 242 and 243, which are integral with $Av$ slide 201 and $Tv$ slide 213, respectively. A pin 244 engages slot 241 and carries a spacing disc 245, which may be formed of insulating material for purposes hereinafter described. Pivoted on pin 244 are two links 246 and 249, one on each side of mechanism plate 206 (which is not shown in its entirety in FIGS. 5–11). Link 246 engages pin 243 by means of a first slot 247 in its upper end, and engages pin 242 by means of a second slot 248 in its lower end. Link 249, which also is pivoted on pin 244, has an upper lateral surface 250 engaging an arm 265 of slide 232, and has a lower lateral surface 251a engaging a crank 251 (see also FIG. 6), which is pivoted on a pin 252. Crank 251 and slide 232 lie in respective planes that are located substantially equidistant from pin 244. A spring 253 urges crank 251 clockwise (FIG. 6) about pin 252 into contact with the surface of a cam 254. Cam 254 is adapted to turn with a shaft 255 and permits a system input of the film sensitivity (Sv).

Links 246 and 249, along with control members or slides 201, 213 and 232, constitute a differential mechanism representing the four variables of the system; that is, lens aperture (Av) exposure time (Tv), field brightness (Bv) and film sensitivity (Sv). The motions imparted to links 246 and 249 by slides 201 (Av), 213 (Tv) and 232 (Bv), and by the bracket comprising crank 251 and spring 253 (Sv) are such that one stop of exposure is represented by identical increments of motion at each of the four contacts with the two links.

Figure 10:
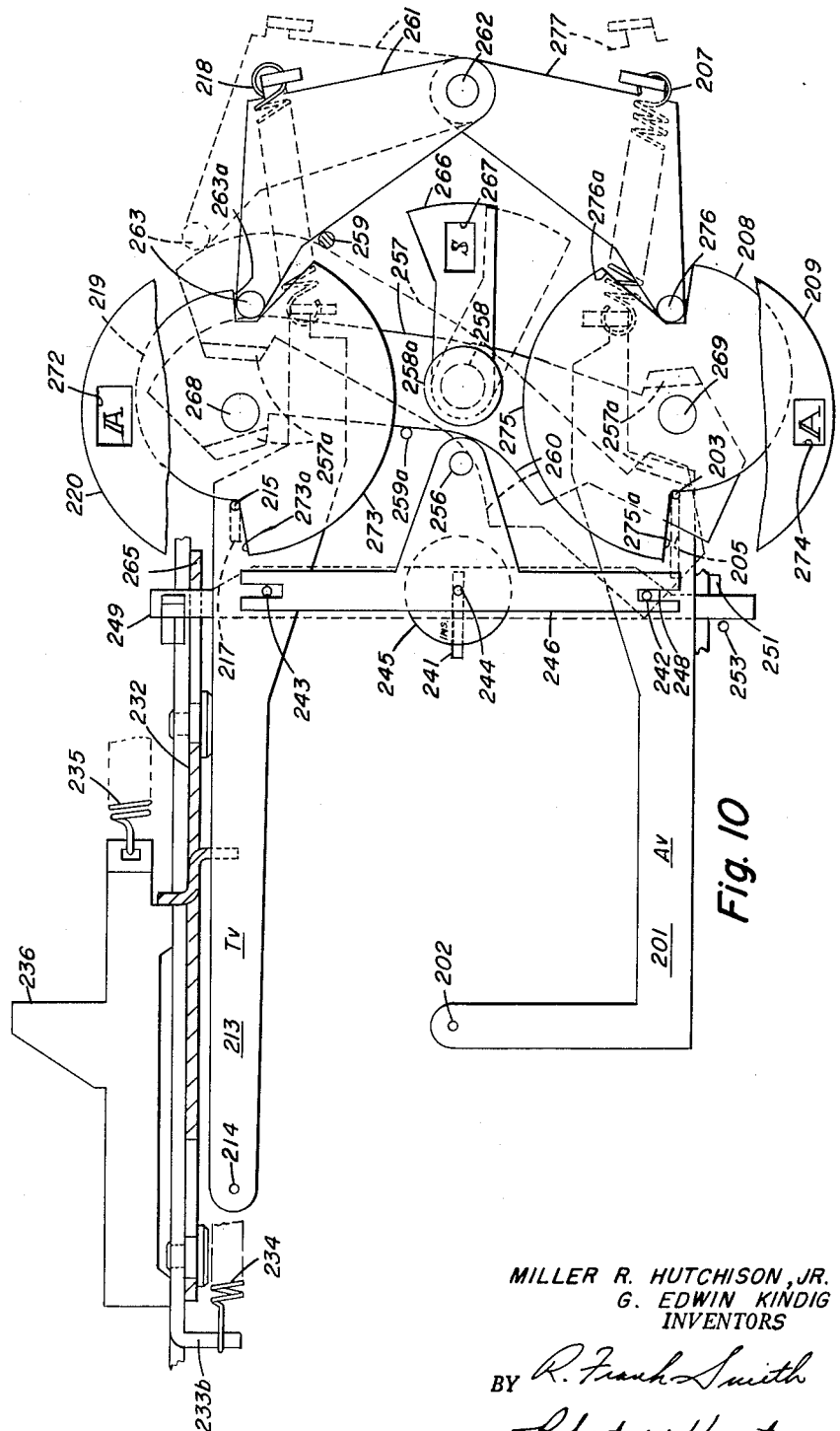

Referring to FIGS. 7 and 10, knob 220 is secured to a shaft 268, which is rotatably mounted in mechanism plate 206 and has a pair of integral, coplanar cam surfaces 219 and 273. Cam surface 219 cooperates with pin 215 on the Tv slide for moving that slide to any desired position within its range, in response to manual turning of knob 220 counterclockwise from the position shown in the drawings. Knob 220 and its cam surfaces 219 and 273 can be maintained in any selected counterclockwise position, against the tension of a spring 264 (FIG. 7), by means hereinafter described.

Cam surface 273 of knob 220 cooperates with a pin or roller 263 of a lever 261, which is pivoted on a shaft 262. When knob 220 is turned counterclockwise from the position shown in FIG. 10, roller 263 rides out of a notch 263a and onto cam surface 273, thereby pivoting lever 261 clockwise against the tension of a spring 218, which interconnects lever 261 and the Tv slide 213. This action increases the spring tension on the Tv slide for purposes described hereinafter.

Similarly, knob 209, which is secured to and turns with a shaft 269, has a pair of integral, coplanar cam surfaces 208 and 275 cooperating, respectively, with pin 203 on the Av slide 201 and with a pin or roller 276 on a lever 277. This lever, like lever 261, is pivoted on shaft 262; it is connected to the Av slide 201 by a spring 207, the tension of which can be increased by turning knob 209 clockwise to move roller 276 out of a notch 276a and onto cam surface 275. Cam surface 208 moves pin 203 and the Av slide 201 to any desired position within the Av range, in response to clockwise turning of knob 209, which is resisted by a spring (not shown) similar to spring 264 (FIG. 7).

A program control lever 257, is secured to and pivoted by a shaft 258 and is adapted to be turned manually by a knob 258a (see also FIG. 4), being limited in its clockwise movement by a stop pin 259, and in its counterclockwise movement by a stop pin 259a. When lever 257 is in its clockwise position, as shown in FIG. 5, a cam surface 260 thereon engages a pin or roller 256, which is mounted on link 246. The cooperation between cam surface 260 and roller 256 is described below in connection with operating Mode I.

When lever 257 is turned to its counterclockwise position, a pair of ramps 257a, which are formed at its two ends, ride over the ends of the shafts 268 and 269 of knobs 220 and 209, respectively. One ramp 257a is shown in FIG. 7. Lever 257 must be deflected slightly out of its plane to assume this position; therefore, its ends act as leaf springs and force the two knobs 209 and 220 axially away from that lever, such that their forward faces (illustrated in FIG. 7 at 270) are in frictional engagement with the inner surface of a front cover 271 of the camera. The frictional contact must be sufficient to hold knob 209 and 220 in any positions to which they may be turned manually against the torque of the previously described springs 264. The faces of knob 209 and 220 and/or the complementary inner surface of plate 271 may be knurled or roughened for this purpose.

The upper surface of the program lever 257 also bears against roller 263 of lever 261, permitting that roller to lie in notch 263a when lever 257 is in its counterclockwise position, but rocking lever 261 clockwise about shaft 262, to increase the tension of spring 218, when lever 257 is moved clockwise, as shown in FIG. 5. With lever 257 in its clockwise position, where it is held against the tension of spring 218 by frictional engagement with plate 206, knobs 209 and 220 are free to be restored by their springs 264 to the positions shown in FIG. 10, where they are stopped by engagement of pins 203 and 215 by stop surfaces 275a and 273a of knobs 209 and 220, respectively.

Mode I—Fully Automatic

This operating mode is selected by moving the program knob 258a (FIGS. 4 and 5) and its integral program lever 257 to full clockwise positions, as shown in FIG. 5, thereby releasing both selection knobs 209 and 220 for return to their stop positions (also shown in FIG. 5), if they have been displaced from such positions for a previous camera operation. When knobs 209 and 220 are in their stop positions, respective indicia "A" (automatic) thereon are aligned with windows 272 and 274 (FIGS. 4 and 10) in the front camera cover 271. When the program lever 257 is in its clockwise position, a flag 266, which is integral with the shaft 258 carrying lever 257, lies out of alignment with a window 267 and exposes a fixed indicium "A" (automatic) at that window. The clockwise position of the program lever 257 also places its cam surface 260 into engagement with roller 256 of differential link 246, and increases the tension of spring 218, relative to spring 207 for maintaining such engagements, as explained hereinafter.

As the camera actuating member 236 (FIGS. 5, 7 and 10) is moved to the left (manually), the Bv slide 232, being urged leftward by spring 234, follows. Ear 265 of slide 232, which engages link 249, moves the upper end of that link to the left. The center of link 249 pivots on the center pin 244 and moves the pin to the left, while the lower end of link 249 is held stationary between crank 251 and spring 253. Link 246, which also is pivoted on the center pin 244, moves to the left with that pin. The upper and lower ends of link 246 drive pins 242 and 243, respectively, to the left, thereby changing the diaphragm and the shutter adjustment commensurately.

Roller 256 of link 246 programs the rate of such changes by remaining in contact with cam surface 260 of lever 257. This cam surface, as it is illustrated in FIGS. 5 and 10, is shaped so as to change the diaphragm setting at approximately twice the rate of the change in the shutter speed setting. Other programs obviously are possible and may be preselected by suitably shaping the cam surface 260. For example, the shutter and diaphragm settings may be changed at equal rates until the slowest shutter speed is reached, then only the diaphragm changed until the maximum aperture is reached. The increased tension of spring 218, relative to spring 207, which was accomplished by moving the program lever 257 to its clockwise position, permits the Av slide 201 to move faster than the Tv slide 213, thereby rocking link 246 clockwise about the center pin 244 and maintaining roller 256 firmly in contact with cam surface 260.

When the actuating member 236 reaches the end of its travel, it trips the shutter trigger, in the manner previously described, thereby making an exposure with diaphragm and shutter settings that have been programmed automatically in accordance with Mode I operation.

In order to adjust the exposure control system to another operating mode, the program lever 257 (FIGS. 5 and 10) is rocked counterclockwise, which brings flag 266, bearing the letter "S" (select), to a position visible in window 267. Rocking lever 257 counterclockwise also releases the extra tension on spring 218 and withdraws the cam surface 260 from contact with roller 256 of link 246, so that surface 260 no longer guides that pin. With the control mechanism thus adjusted, three additional modes of operation are possible, two of which are automatic and one of which is manual.

*Mode II—Automatic With Preferred Shutter Speed*

In this mode of operation, after manual setting of compensation for film sensitivity and manual selection of any preferred shutter speed, movement of actuating member 236 adjusts the diaphragm automatically as a function of scene brightness. In the event that the diaphragm reaches maximum aperture before the meter pointer 238 (FIG. 5) is sensed by cam 237a, the shutter speed is reduced automatically to the appropriate value, overriding the selected preference of shutter speed.

The available shutter speeds are marked on the face 270 of shutter speed knob 220, as shown through window 272 in FIG. 4. Knob 220 also carries an indicium "A" (automatic), which is visible in window 272 when the knob is in its rest position. Movement of the knob 220 counterclockwise (FIGS. 5 and 10) to select a preferred shutter speed brings cam surface 273 into contact with pin 263 of lever 261, thereby rocking lever 261 clockwise about its pivot 262 and extending spring 218. At the same time pin 215, which is integral with the Tv slide 213, is moved leftward by cam surface 219, thereby moving slide 213 leftward commensurately with the selected shutter speed. Because program lever 257 is in its counterclockwise position at this time, the friction between plate 271 and the face 270 of knob 220 holds that knob in the selected position against the force of the return spring 264.

As the Bv slide 232 and its cam 237a are moved to the left for sensing the position of the meter pointer 238, lug 265 on slide 232 imparts a leftward motion to the upper end of differential link 249. The final position of pin 244 is determined by the extent of this motion, together with the position of Sv crank 251, which holds the bottom end of link 249 stationary. During the initial movement of the Bv slide 232, the Tv slide 213, its pin 243 and therefore the upper end of link 246, are held stationary, due to the increased tension of spring 218. Link 246 rocks clockwise about pin 244, pivoting on the stationary Tv pin 243. The lower end of link 246 moves pin 242 and its Av slide 201 to the left, thereby setting the diaphragm blades to the aperture required to compensate for the previously imposed variables Sv, Tv and Bv. If, before the sensing cam 237a engages pointer 238, pin 242 reaches its maximum leftward position (which occurs when pin 203 reaches the left end of slot 205), then link 246 pivots counterclockwise about pin 242 in response to further leftward movement of the center pin 244, thereby moving pin 243 and the Tv slide 213 further leftward to override the selected setting of preferred shutter speed.

*Mode III—Automatic With Preferred Diaphragm Opening*

To prepare the camera for operation in Mode III, knob 220 must be positioned at "A" to relieve the extra tension in spring 218. Also, the setting of film sensitivity and the selection of a preferred maximum lens aperture are accomplished manually. Thereafter, the shutter speed is adjusted automatically as a function of field brightness, in response to movement of actuating member 236. In the event that the shutter speed reaches its minimum limit value before the meter pointer is sensed, the control mechanism automatically increases the lens aperture to the appropriate size, overriding the selected preference of aperture size.

The available lens aperture values are marked on the face of knob 209, as shown in window 274 of FIG. 4. Knob 209 also carries the indicium "A" (automatic), which is visible in window 274 when the knob is in its rest position.

When knob 209 is turned clockwise (FIGS. 5 and 10) to select a preferred lens aperture, its cam surface 275 moves into engagement with roller 276 of lever 277 and turns that lever counterclockwise about its pivot 262, thereby extending spring 267 and increasing its tension relative to that of spring 218. At the same time, counterclockwise turning of knob 209 imparts a leftward movement to the Av slide 201 through positioning of pin 203 by cam surface 208. The friction between the face of knob 209 and plate 271 (FIG. 7) holds the knob in the selected position against the force of its return spring as in the case of knob 220 in Mode II operation.

As the Bv slide 232 and its cam 237a are moved to the left to sense the meter pointer 238, leftward motion is imparted by arm 265 of slide 232 to the upper end of link 249, which rocks counterclockwise about pin 244, pivoting on the stationary spring 253 and crank 251 at its lower end. Pin 244 also moves to the left in slot 241, thereby moving the center of link 246 to the left. Because of the unbalance in springs 267 and 218 at this time, the former being under extra tension, pin 242 holds the lower end of link 246 stationary. Therefore, the leftward movement of the center of link 246 (with pin 244) causes the upper end of that link to move pin 243 and the Tv slide 213 leftward, changing the shutter speed adjustment commensurately. If the Tv slide 213 reaches its limit, or minimum-speed position (which occurs when pin 215 reaches the left end of slot 217) before the meter pointer is sensed by cam 237a, link 246 thereafter pivots about pin 243 when the center pin 244 is moved further to the left. This imparts leftward motion to the Av slide 201 through pin 242 and overrides the selected preference of maximum aperture size.

*Mode IV—Manual*

Figure 11:
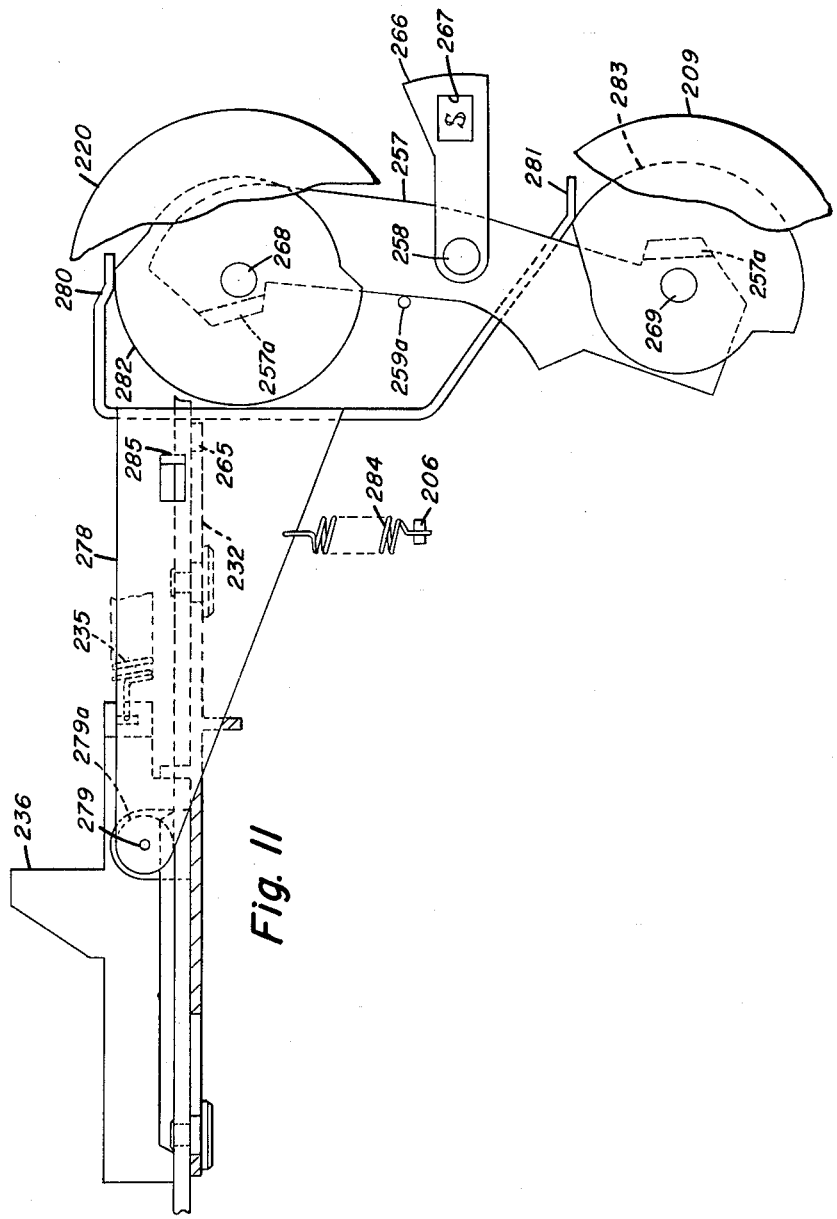

Referring to FIGS. 7 and 11, operation in Mode IV permits the photographer to have complete manual control of the exposure variables. For this operating mode, the program lever 257 is again in its counterclockwise position, providing a friction hold on the two control knobs 209 and 220.

Fixed to a bracket 278 is a pin 279, pivoting in a bushing 279a, which is anchored to mechanism plate 206. A pair of arms 280 and 281 of bracket 278 cooperate with a pair of cam surfaces 282 and 283 of knobs 220 and 209, respectively. A spring 284 urges bracket 278 clockwise about its pivot 279, urging arms 280 and 281 toward contact with their corresponding cam surfaces 282 and 283. With the various elements in the positions shown in FIG. 11, cam surfaces 282 and 283 hold bracket 278 in a position such that a lug 285, which is formed out of the bracket, permits ear 265 of slide 232 to pass freely to the left for other modes of operation. Similarly, if only one knob 209 or 220 is turned for manually selecting either a preferred aperture or a preferred shutter speed, but not both (Mode II or Mode III), lug 285 permits ear 265 of slide 232 to pass freely. However, if both knobs 209 and 220 are turned, thereby manually selecting both an aperture and a shutter speed (Mode IV), arms 280 and 281 both move to lower levels of cam surfaces 282 and 283, and spring 284 rocks bracket 278 clockwise to a position wherein lug 285 blocks the leftward movement of ear 265. In this case, the manual turning of knobs 209 and 220 moves the Av slide 201 and the Tv slide 213 to respective positions commensurate with the selected values.

Inasmuch as the motion of the Bv slide 232 is blocked during Mode IV operation, the meter energization does not affect the exposure setting. However, the camera actuating member 236 can be moved to the left, tripping the shutter, even though the Bv slide 232 is blocked, because member 236 moves slide 232 only through the coupling afforded by spring 234 (FIG. 5).

VIEWFINDER SIGNALS

High-Light Signals

Figure 12:
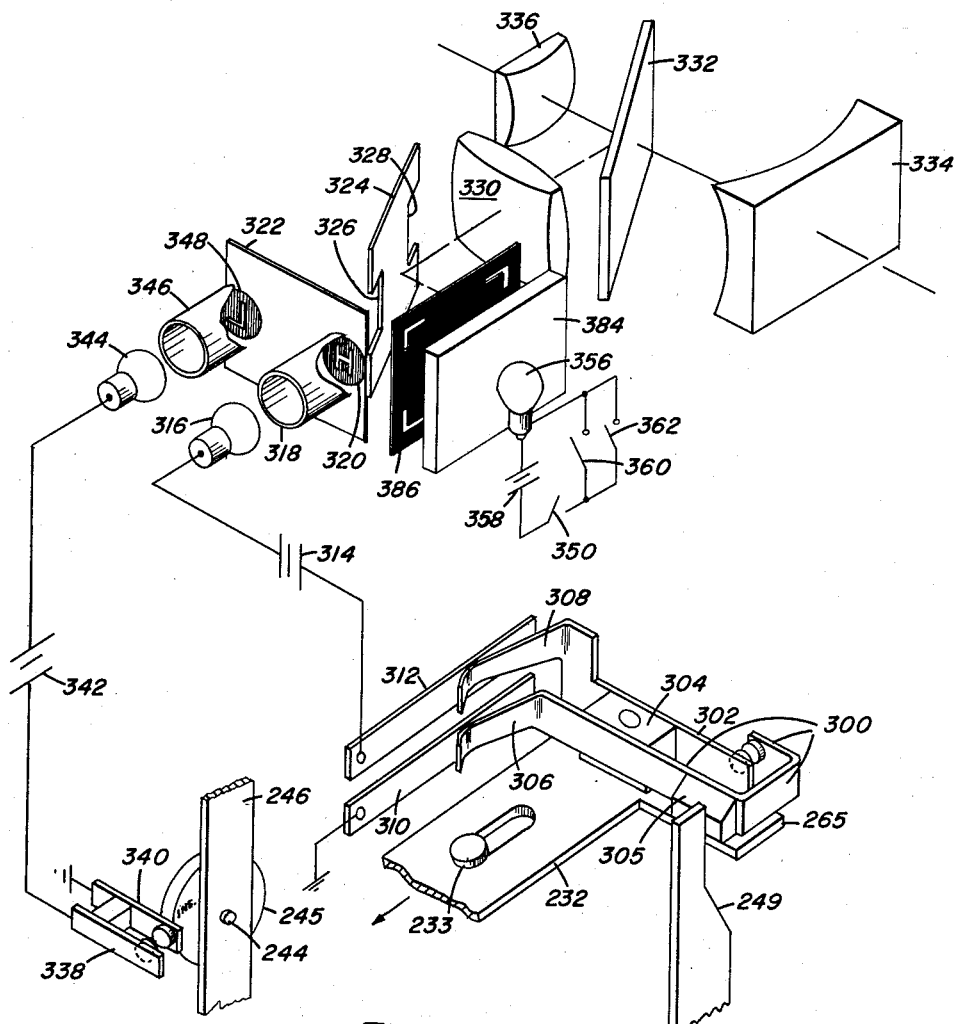
FIG. 12 is a partially exploded isometric view of a portion of the viewfinder and the signal control mechanism.

Referring to FIGS. 5, 10 and 12, it will appear from the foregoing description of the differential mechanism, which includes links 246 and 249, that when a relatively high film sensitivity (such as $Sv=7$) is selected, the $Sv$ crank 251 is moved substantially to the right, thereby permitting the lower end of link 249 to be moved to the right by spring 253. If a relatively low shutter speed is selected manually under these circumstances, pin 215 and its integral $Tv$ slide 213 are moved relatively far to the left by cam surface 219 of knob 220. This moves the $Tv$ slide pin 243 to the left and therefore rocks link 246 counterclockwise about the $Av$ slide pin 242. The center pin 244, which supports both links 246 and 249, moves to the left, thereby rocking link 249 counterclockwise about the bracket comprising crank 251 and spring 253. This separates the upper end of link 249 from the following ear 265 on the $Bv$ slide 232. Under such conditions, the positions of the $Av$, $Tv$ and $Bv$ slides no longer accurately represent the exposure factors in the equation $$Bv+Sv=Ev=Av+Tv$$

which requires all of the differential members to be in full engagement with their associated members. Improper exposure might occur if movement of the camera actuating member 236 to the left tripped the shutter prior to re-engagement of the upper end of link 249 by ear 265 of $Bv$ slide 232.

Similarly, when a high film sensitivity value has been set into crank 251 and a large aperture is selected manually by clockwise movement of knob 209, cam 208 of that knob moves pin 203 to the left, which also moves the $Av$ slide 201, its pin 242 and the lower end of link 246 to the left. This rocks link 246 clockwise about its stationary upper pin 243 and moves pin 244 to the left, thereby rocking link 249 counterclockwise about the stationary $Sv$ crank 251 and spring 253. The movement of the upper end of link 249 again separates it from ear 265 of the $Bv$ slide 232, indicating that an accurate exposure would not be made if a picture were taken prior to re-engagement of these members.

In both of the foregoing examples, the error that would occur in taking a picture with link 249 separated from ear 265 is due to the system being off range in the direction of high field brightness, i.e., the brightness indicated by the full-right position of $Bv$ slide 232 (not necessarily the prevailing field brightness) is above the range of the exposure control mechanism. However, movement of the camera actuating member 236 to the left, which member is followed by the $Bv$ slide 232 until pointer 238 is sensed by cam 237a to stop further movement of the $Bv$ slide, may re-establish connection of ear 265 with link 249 prior to tripping the shutter. Such connection is re-established if and only if the prevailing field brightness is sufficiently low to permit enough movement of the $Bv$ slide to compensate for the initial separation of ear 265 and link 249. If such connection is re-established, and if the camera operator is so apprised, then he knows that the exposure will be correct and he can continue movement of member 236 to trip the shutter. The structure for so apprising or signalling the operator is illustrated in FIGS. 12 and 13.

A leaf spring electrical contact 300 cooperates with a second electrical contact 302, both of these contacts being mounted by an insulating member 304 on the $Bv$ slide 232. An insulating member 305, which is integral with spring contact 300, engages the upper end of link 249, along with ear 265 of the $Bv$ slide 232. A pair of spring fingers 306 and 308 are integral with contacts 300 and 302 and wipe along a pair of bar contacts 310 and 312, respectively. When the switch comprising contacts 300 and 302 is closed, a circuit is completed through these contacts, and through a battery segment 314 and a lamp 316 for energizing the latter. In the event that the upper end of link 249 moves away from ear 265 of the $Bv$ slide 232, spring contact 300 closes against contact 302, thereby completing the foregoing circuit to energize lamp 316, which establishes a signal indicating the off-range, or high-light condition described above.

Lamp 316 is mounted in an open ended cylinder 318 and is aligned with a colored signal 320, which may be formed as part of a transparent film 322. Signal 320 may outline the letter "H" (for high light), which appears in the camera viewfinder when lamp 316 is energized. For this purpose, light from lamp 316 illuminates signal 320, forming a beam that is transmitted through a lateral notch 326 of a mirror 324, a lens 330, a beam splitter 332 and an eye lens 336, which is aligned with the usual negative front lens 334 of the viewfinder. To those familiar with the lens art it will be apparent that lens 330 is necessary only if the divergence of the signal beam arriving at eye lens 336 is substantially different from that of the light emerging from lens 334.

Low-Light Signal

A similar structure produces a separate signal in the viewfinder when the prevailing field brightness is below the normal exposure control range, e.g., when a low film sensitivity is selected, along with either a high shutter speed or a small diaphragm aperture. In such case, movement of the camera actuating member 236 (FIGS. 5 and 10) to the left, and the following movement of the $Bv$ slide 232 to the left, causes the center pin 244 of the differential mechanism to reach a leftward position corresponding to the $Ev$ limit of the system, prior to entrapment of the meter pointer 238 by the sensing member 237a.

Referring to FIG. 12, the insulated spacing disk 245, which is mounted on pin 244, cooperates with a pair of switch contacts 338 and 340, and closes these contacts whenever pin 244 reaches the low-light position referred to above. Closure of contacts 338 and 340 completes an electrical circuit through these contacts, and through a battery segment 342 and a lamp 344, which is mounted in an open-ended cylinder 346 and aligned with a second signal 348. This signal may outline the letter "L" (for low light) and may be formed as a part of the previously described transparent film 322. Light from lamp 344 is transmitted through signal 348, a lateral notch 328 in mirror 324, and the previously described lens 330, beam splitter 332 and eye lens 336.

It is desirable that the camera operator, without tripping the shutter, be able to determine whether or not the prevailing field brightness is within the range of the exposure control system, with the latter in any current state of adjustment. For this purpose, a spring 388 (FIG. 13) is located in the path of a projection 354 on the camera actuating member 236 at such a position that the camera operator can feel the added resistance of spring 388 to movement of member 236, just before the shutter is tripped by engagement of a shutter trigger 390 by projection 354. If neither the low-light signal nor the high-light signal appears in the finder when spring 388 is sensed, the camera operator knows that subsequent tripping of the shutter will produce a normal exposure.

Frame Reticle

When both selector knobs 209 and 220 (FIGS. 5 and 10) are in their automatic, or "A" positions, the program lever 257 should be in its clockwise position in order to maintain its cam surface 260 in contact with roller 256 of differential link 246 for fully automatic operation (Mode I). If the program lever 257 is in its counterclockwise position at this time, operation of the camera actuating member 236 does produce a proper exposure, but the program is determined by the various spring tensions and the friction between the various moving parts, rather than being under control of cam surface 260. It may be desirable to apprise the camera operator of the fact that no specific program is established at this time. A signal mechanism for so informing the camera operator is generated by mechanism shown in FIGS. 12 and 13.

A third lamp 356 is aligned with a diffusing member 384 (FIG. 12) and, when energized, illuminates a frame reticle 386, which may be formed on a piece of transparent film. The reticle beam is reflected by the corners of the previously mentioned mirror 324, and is transmited through lens 330, beam splitter 332 and the eye lens 336.

Lamp 356 is connected in series with a battery segment 358 and a normally open switch 350, and with either of a pair of normally open switches 360 and 362 that are connected in parallel with each other.

Referring back to FIG. 13, switch 350 comprises a pair of contacts, one of which has an arm 352 cooperating with an upper ramp, or cam surface 354a of the previously mentioned extension 354 of the camera actuating member 236. When the actuating member is in its righthand (rest) position, its extension 354 urges contact arm 352 upward, thereby holding contacts 350 out of engagement with each other for maintaining lamp 356 de-energized, regardless of any other condition of the lamp circuit.

Contacts 360 of this circuit cooperate with flag 266, which turns with the program lever 257. Contacts 360 are closed by flag 266 only when the program lever is in its clockwise position, where it is required to be for Mode I operation, and where it permits the appearance of the letter "A" (for automatic) in camera window 267. Therefore, if the program lever 257 is in its clockwise position, lamp 356 is energized through contacts 350 and 360 in response to movement of the camera actuating lever to the left, regardless of other conditions of the circuit.

When the progam lever 257 is in its counterclockwise position, displaying the letter "S" (for selection) in camera window 267, contacts 360, the upper one of which is formed as a leaf spring, are open; therefore, closure of contacts 350 does not energize lamp 356 unless contacts 362 also are closed. The latter contacts are formed as leaf springs, each cooperating with a respective lever 364 and 366. These levers are pivotally mounted at 368 and 370 and are urged away from the switch contacts 362 by respective springs 372 and 374. Levers 364 and 366 cooperate with respective notches 376 and 378 in a pair of disks 380 and 382 mounted on the knob shafts 268 and 269. Notches 376 and 378 are in registry with their associated levers 364 and 366 when the corresponding knob shafts 268 and 269 are in such angular positions that the letters "A" appear in the respective windows 272 and 274 of the camera cover, i.e., when no shutter speed or diaphragm opening has been selected manually. Any manual selection of a shutter speed or diaphragm opening causes the outer periphery of disk 380 or 382 to move its corresponding lever 364 or 366 for closing contacts 362. It will therefore be seen that when the program lever 257 is in its counterclockwise position, the circuit for lamp 356 can be completed only if a manual selection of either shutter speed (Mode II) or diaphragm opening (Mode III) or both (Mode IV) has been made. Accordingly, unless lamp 356 is energized, which causes the frame reticle to appear in the viewfinder before the actuating member 236 senses spring 388, the camera operator knows that he is not operating the camera in any of its four prescribed modes, but that he will obtain a random program (and a correct exposure) determined by spring tensions and friction.

The invention has been described in detail with particular reference to preferred embodiments thereof, but it will be understood that variations and modifications can be effected within the spirit and scope of the invention as described hereinabove and as defined in the appended claims.

We claim:
1. In a camera, an exposure control system comprising, in combination: an exposure meter including a member automatically displaceable throughout a range of positions as a function of field brightness; a first exposure regulating device comprising an adjustable lens diaphragm; a first movable control member coupled to said diaphragm; a second exposure regulating device comprising an adjustable shutter speed setting member; a second movable control member coupled to said setting member; an adjustable film sensitivity compensating member; a third movable control member coupled to said compensating member; a fourth movable control member; sensing means movable with said fourth control member and disposed in sensing relation with said displaceable member; first and second differential mechanisms, each intercoupling a respective pair of said control members; means intercoupling said first and second differential mechanisms; and manually operable means for moving said fourth control member to move said sensing means into sensing engagement with said displaceable member, thereby moving at least one of said first and second control members for adjusting at least one of said regulating devices as a function of field brightness.

2. The combination defined in claim 1, wherein one of said differential mechanisms intercouples said first and second control members.

3. The combination defined in claim 1, wherein one of said differential mechanisms intercouples said first and fourth control members.

4. The combination defined in claim 1, wherein said means for intercoupling said differential mechanisms comprises a movable rigid member.

5. The combination defined in claim 4, with adjustable means limiting the movement of said rigid member.

6. The combination defined in claim 5, wherein the position of said rigid member represents the prevailing exposure value setting of said exposure control system, with a fixed member, said rigid member and said fixed member carrying cooperating exposure value scale indicia.

7. In a camera, an exposure control system comprising, in combination: an exposure meter including a member automatically displaceable throughout a range of positions as a function of field brightness; a first exposure regulating device comprising an adjustable lens diaphragm; a first movable control member coupled to said diaphragm; a second exposure regulating device comprising an adjustable shutter speed setting member; a second movable control member coupled to said setting member; an adjustable film sensitivity compensating member; a third movable control member coupled to said compensating member; a fourth movable control member; sensing means movable with said fourth control member and disposed in sensing relation with said displaceable member; differential means intercoupling said control members; and manually operable means for moving said fourth control member to move said sensing means into sensing engagement with said displaceable member, thereby moving at least one of said first and second control members for adjusting at least one of said regulating devices as a function of field brightness.

8. The combination defined in claim 7, with adjustable means limiting the movement of said first control member.

9. The combination defined in claim 7, with adjustable means limiting the movement of said second control member.

10. The combination defined in claim 7, with: means normally restraining said third control member from movement except in response to adjustment of said compensating member; and selectively operable means for overcoming said restraining means.

11. The combination defined in claim 7, with: respective tensioned members yieldably resisting movement of said first and second control members; and selectively operable means for increasing the tension of either of said tensioned members relative to the other.

12. The combination defined in claim 7, wherein said manually operable means includes an actuating member movable through a predetermined stroke, with: first and second devices for limiting the movement of said first and second control members, respectively; and means operable, in response to initial movement of said actuating member, for moving one of said first and second control members to the limit of its movement, and operable in response to further movement of said actuating member, for moving the other of said first and second control members toward its limit position until said sensing means engages said displaceable member.

13. The combination defined in claim 7, with means controlled jointly by said differential mechanism and one of said control members for indicating at a viewing locus the uncoupling of said one control member from said differential mechanism.

14. In a camera, an exposure control system comprising, in combination: an exposure meter including a member automatically displaceable throughout a range of positions as a function of field brightness; a first exposure regulating device comprising an adjustable lens diaphragm; a second exposure regulating device comprising an adjustable shutter speed setting member; an adjustable film sensitivity compensating member; a sensing member disposed in sensing relation with said displaceable member; manually operable means for moving said sensing member into sensing engagement with said displaceable member; and a differential mechanism intercoupling said regulating devices, said compensating member and said sensing member for adjusting both of said regulating devices in response to movement of said sensing member.

15. The combination defined in claim 14, wherein said differential mechanism includes a single member coupled to both of said regulating devices and movable, in response to movement of said sensing member, for adjusting both of said regulating devices simultaneously throughout movement of said sensing member.

16. The combination defined in claim 14, with selectively operable means for manually setting any of a plurality of absolute limits for the adjustment of at least one of said exposure regulating devices.

17. The combination defined in claim 14, with: means for limiting absolutely the adjustment of one of said exposure regulating devices; selectively operable means for setting a preferred limit of adjustment for the other of said devices; and means operable in response to adjustment of said one device to its absolute limit for overriding the preferred limit of said other device.

18. The combination defined in claim 14, with: means for manually controlling the adjustment of both of said regulating devices; and means for disabling said sensing member.

19. In a camera, an exposure control system comprising, in combination: an exposure meter including a member displaceable throughout a range of positions as a function of field brightness; a first exposure regulating device comprising an adjustable lens diaphragm; a second exposure regulating device comprising an adjustable shutter speed setting member; a movable sensing member adapted to engage said displaceable member for sensing the position of the latter; an actuating member in driving relation to said sensing member and manually movable through a predetermined stroke for driving said sensing member into engagement with said displaceable member; means interrelating said sensing member and said regulating devices and normally adapted to adjust both of said regulating devices simultaneously in response to movement of said actuating member; and manually operable means for selectively blocking adjustment of either of said regulating devices throughout at least a part of the stroke of said actuating member.

20. The combination defined in claim 19, with means controlled by said blocking means for indicating, at a viewing locus in said camera, the state of operation of said blocking means.

21. The combination defined in claim 19, wherein said blocking means includes means for manually selecting a preferred adjustment of the regulating device whose adjustment is blocked.

22. In a camera, an exposure control system comprising, in combination: an exposure meter including a member displaceable throughout a range of positions as a function of field brightness; a first exposure regulating device comprising an adjustable lens diaphragm; a second exposure regulating device comprising an adjustable shutter speed setting member; a movable sensing member adapted to engage said displaceable member for sensing the position of the latter; an actuating member in driving relation to said sensing member and manually movable through a predetermined stroke for driving said sensing member into engagement with said displaceable member; means interrelating said sensing member and said regulating devices and normally adapted to adjust both of said regulating devices simultaneously in response to movement of said actuating member; respective manually operable means for selectively setting a preferred adjustment limit for each of said regulating devices; and means coupled to said setting means and operable, in response to setting a preferred adjustment limit for both of said regulating devices, for disabling said sensing member.

23. In a camera, an exposure control system comprising, in combination: an exposure meter including a member displaceable throughout a range of positions as a function of field brightness; a first exposure regulating device comprising an adjustable lens diaphragm; a second exposure regulating device comprising an adjustable shutter speed setting member; a movable sensing member adapted to engage said displaceable member for sensing the position of the latter; an actuating member in driving relation to said sensing member and manually movable through a predetermined stroke for driving said sensing member into engagement with said displaceable member; means interrelating said sensing member and said regulating devices for adjusting both of said regulating devices in response to movement of said actuating member; selectively operable means for blocking adjustment of either of said regulating devices throughout an initial portion of the stroke of said actuating member; and means, including a part of said interrelating means, for overcoming said blocking means when said one regulating device reaches a predetermined limit of adjustment.

24. In a camera, an exposure control system comprising, in combination: an exposure meter including a member displaceable throughout a range of positions as a function of field brightness; a first exposure regulating device comprising an adjustable lens diaphragm; a second exposure regulating device comprising an adjustable shutter speed setting member; control means interrelating said displaceable member and said regulating devices, said control means having a plurality of settings and operable in a first setting for adjusting both of said regulating devices simultaneously as a joint function of the position of said displaceable member, and operable in a second setting for adjusting only one of said regulating devices as a function of the position of said displaceable member; and manually operable program means coupled to said control means for selectively adjusting said control means to either of said first and second settings.

25. In a camera, an exposure control system comprising, in combination: an exposure meter including a member displaceable throughout a range of positions as a function of field brightness; a first exposure regulating device comprising an adjustable lens diaphragm; a second exposure regulating device comprising an adjustable shutter speed setting member; a movable sensing member adapted to engage said displaceable member for sensing the position of the latter; an actuating member in driving relation to said sensing member and manually movable through a predetermined stroke for driving said sensing member into engagement with said displaceable member; means interrelating said sensing member and said regulating devices for adjusting at least one of said regulating devices in response to movement of said actuating member; and a programming mechanism controlling said adjusting means and having a first manually settable control state for constraining said adjusting means to adjust only said first regulating device in response to movement of said actuating member through an initial portion of said stroke and to adjust only said second regulating device in response to movement of said actuating member through an additional portion of said stroke, said programming mechanism having a second manually settable control state for constraining said adjusting means to adjust only said second regulating device in response to movement of said actuating member through an initial portion of said stroke and to adjust only said first regulating device in response to movement of said actuating member through an additional portion of said stroke.

References Cited in the file of this patent
UNITED STATES PATENTS

| | | |
|---|---|---|
| 2,879,702 | Gossen | Mar. 31, 1959 |
| 2,960,921 | Greger | Nov. 22, 1960 |
| 2,997,936 | Starp | Aug. 29, 1961 |